(12) United States Patent
Gill et al.

(10) Patent No.: US 12,705,451 B2
(45) Date of Patent: Aug. 11, 2026

(54) METHODS AND APPARATUS FOR THE ARBITRATION OF RF POWER BETWEEN AN ULTRA HIGH FREQUENCY (UHF) RADIO-FREQUENCY IDENTIFICATION (RFID) SYSTEM AND AN EXTERNAL ASSEMBLY

(71) Applicant: Powercast Corporation, Pittsburgh, PA (US)

(72) Inventors: Jason Arthur Gill, Pittsburgh, PA (US); Eric James Biel, Glenshaw, PA (US); Charles Edward Greene, Butler, PA (US)

(73) Assignee: Powercast Corporation, Pittsburgh, PA (US)

( * ) Notice: Subject to any disclaimer, the term of this patent is extended or adjusted under 35 U.S.C. 154(b) by 0 days.

(21) Appl. No.: 18/805,235

(22) Filed: Aug. 14, 2024

(65) Prior Publication Data

US 2026/0050759 A1 Feb. 19, 2026

(51) Int. Cl.
*G06K 19/07* (2006.01)

(52) U.S. Cl.
CPC ................................ *G06K 19/0723* (2013.01)

(58) Field of Classification Search
CPC .................................................. G06K 19/0723
USPC .......................................................... 235/492
See application file for complete search history.

(56) References Cited

U.S. PATENT DOCUMENTS

| | | | | |
|---|---|---|---|---|
| 10,786,693 | B1 * | 9/2020 | Opperman | A62B 18/02 |
| 12,343,575 | B1 * | 7/2025 | Dashevsky | A62B 18/02 |
| 2006/0126754 | A1 * | 6/2006 | Filimonov | H03C 3/40 375/302 |
| 2018/0026678 | A1 * | 1/2018 | Biederman | A61B 5/6801 455/41.1 |

(Continued)

FOREIGN PATENT DOCUMENTS

EP 3757891 A1 12/2020

OTHER PUBLICATIONS

Kapucu et al., "A passive UHF RFID system with a low-power capacitive sensor interface," 2014 IEEE RFID Technology and Applications Conference, Sep. 8, 2014, pp. 301-305.

(Continued)

*Primary Examiner* — Allyson N Trail
(74) *Attorney, Agent, or Firm* — COOLEY LLP

(57) ABSTRACT

In some embodiments, an apparatus includes an antenna, analog circuitry, a radio-frequency identification (RFID) state machine, a radio-frequency-to-direct current (RF-to-DC) converter, and one of a splitter or a switch operatively coupled to the RF-to-DC converter and the RFID state machine. The analog circuitry configured to demodulate a first portion of a radio frequency (RF) signal received via the antenna to produce a demodulated RF signal. The RFID state machine configured to decode the first portion of the demodulated RF signal to produce a decoded signal, and to generate an output signal based on the decoded signal. The RF-to-DC converter can be configured to receive a second portion of the RF signal from the antenna and to convert the (Continued)

second portion of the RF signal to a power associated with a direct current (DC) voltage. The RFID state machine and the external assembly each configured to operate based on the power.

20 Claims, 11 Drawing Sheets

(56) References Cited

U.S. PATENT DOCUMENTS

| | | | | |
|---|---|---|---|---|
| 2018/0360341 | A1* | 12/2018 | Wang | A61B 5/681 |
| 2020/0247562 | A1* | 8/2020 | Stein | G01M 5/0033 |
| 2021/0259096 | A1 | 8/2021 | Diaz et al. | |
| 2021/0391804 | A1* | 12/2021 | Salama | H02M 1/08 |
| 2025/0070596 | A1* | 2/2025 | Al-Absi | H02J 50/20 |

OTHER PUBLICATIONS

PCT Application No. PCT/US2025/041881, International Search Report and Written Opinion mailed Dec. 12, 2025; Applicant Powercast Corporation; 15 pages.

* cited by examiner

METHODS AND APPARATUS FOR THE ARBITRATION OF RF POWER BETWEEN AN ULTRA HIGH FREQUENCY (UHF) RADIO-FREQUENCY IDENTIFICATION (RFID) SYSTEM AND AN EXTERNAL ASSEMBLY

BACKGROUND

Some embodiments described herein relate generally to systems, methods, and apparatus for the arbitration of radio-frequency (RF) power between an ultra high frequency (UHF) radio-frequency identification (RFID) system and an external assembly.

RFID integrated circuit (IC) tags formed as application-specific integrated circuits (ASICs) typically each includes an integrated RF-to-DC converter configured to supply energy based on a received RF signal to power tag operations. For example, an RF-to-DC converter integrated in an RFID ASIC tag can provide sufficient energy for the tag to demodulate and interpret incoming data, encode, modulate, and backscatter outgoing data, and read and write from a memory of the RFID ASIC tag (e.g., on-chip memory).

Rather than the RF-to-DC converter converting only enough RF energy to direct current and supplying only enough direct current to another component of the RFID ASIC tag for the RFID ASIC tag to perform tag operations (e.g., backscatter communication operations), as is converted and supplied in typical RFID ASIC tags, a need exists for an RFID ASIC tag system that can additionally (e.g., simultaneously or alternatively) supply direct current to circuitry included in an assembly external to the RFID ASIC tag (e.g., to be used as operational power by the external circuitry). Embodiments disclosed herein are directed toward various systems configured to split RF and/or DC power (e.g., based on time and/or power levels or requirements) to provide operational power for the RFID ASIC tag (e.g., for communication operation(s)) and/or to provide operational power to circuitry of an external assembly.

SUMMARY

In some embodiments, an apparatus includes an antenna, analog circuitry (e.g., to communicate via backscatter), a radio-frequency identification (RFID) state machine, a radio-frequency-to-direct current (RF-to-DC) converter, and one of a splitter or a switch operatively coupled to the RF-to-DC converter and the RFID state machine. The analog circuitry can be operatively coupled to the antenna and configured to demodulate a first portion of a radio frequency (RF) signal received via the antenna to produce a demodulated RF signal. The radio-frequency identification (RFID) state machine can be operatively coupled to the analog circuitry. The RFID state machine can be configured to receive the demodulated RF signal from the analog circuitry, to decode the first portion of the demodulated RF signal to produce a decoded signal, and to generate an output signal (e.g., used by the analog circuitry to communicate via backscatter) based on the decoded signal. The RF-to-DC converter can be operatively coupled to the antenna. The RF-to-DC converter can be configured to receive a second portion of the RF signal from the antenna and to convert the second portion of the RF signal to a power associated with a direct current (DC) voltage. The splitter or switch can be configured to be coupled to an external assembly and can be configured to receive the power from the RF-to-DC converter and to provide the power to at least one of the RFID state machine or the external assembly. The RFID state machine and the external assembly are each configured to operate based on the power.

DETAILED DESCRIPTION

Figure 1:
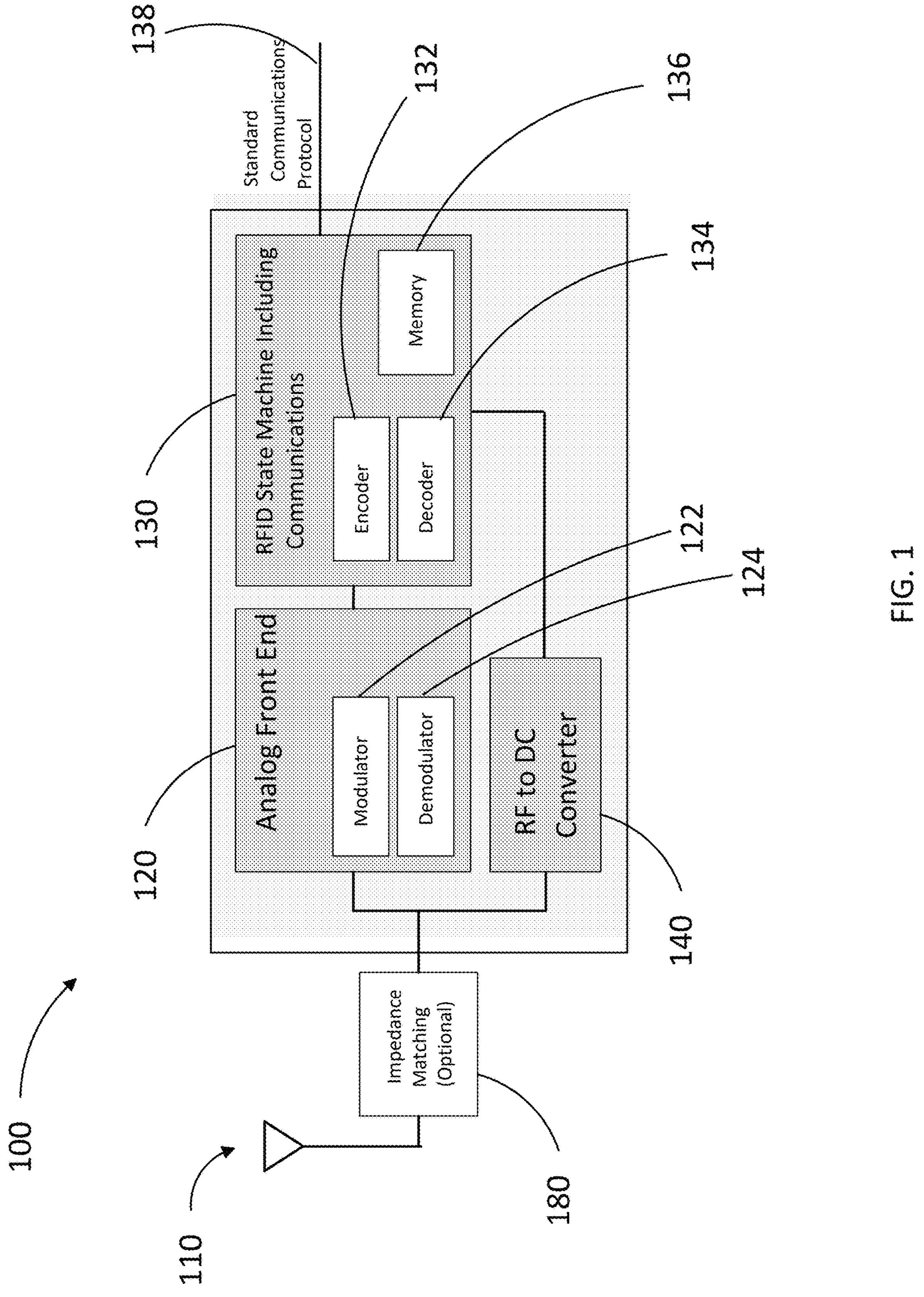
FIG. 1 is a schematic illustration of an RFID ASIC system, according to an embodiment.

In some embodiments, an apparatus includes an antenna, analog circuitry (e.g., to communicate via backscatter), a radio-frequency identification (RFID) state machine, a radio-frequency-to-direct current (RF-to-DC) converter, and one of a splitter or a switch operatively coupled to the RF-to-DC converter and the RFID state machine. The analog circuitry can be operatively coupled to the antenna and configured to demodulate a first portion of a radio frequency (RF) signal received via the antenna to produce a demodulated RF signal. The radio-frequency identification (RFID) state machine can be operatively coupled to the analog circuitry. The RFID state machine can be configured to receive the demodulated RF signal from the analog circuitry, to decode the first portion of the demodulated RF signal to produce a decoded signal, and to generate an output signal (e.g., used by the analog circuitry to communicate via backscatter) based on the decoded signal. The RF-to-DC converter can be operatively coupled to the antenna. The RF-to-DC converter can be configured to receive a second portion of the RF signal from the antenna and to convert the second portion of the RF signal to a power associated with a direct current (DC) voltage. The splitter or switch can be configured to be coupled to an external assembly and can be configured to receive the power from the RF-to-DC converter and to provide the power to at least one of the RFID state machine or the external assembly. In some embodiments, the RF-to-DC converter can be included in the external assembly. The RFID state machine and the external assembly are each configured to operate based on the power.

In some embodiments, systems disclosed herein have the advantage of making DC power that is available to external circuitry through a power out pin and that is efficient, controllable, and customizable. Additionally, systems disclosed herein can be configured to ensure power will be available for both RF communications and to external circuitry through a power out pin using a configuration and method that fits the specific use case of the application of the system. In some embodiments, power can be split or switched between supporting on-board RFID communications and external circuitry via a power out pin, dynamically based on circuit input parameters, or completely independently depending on the application and ease of integration.

Splitting the DC power output of an RF-to-DC converter, as is disclosed with respect to some embodiments described herein, allows the RF communications circuitry and external circuitry to receive power at the same time. In some embodiments, the power budget split can be fixed for ease of design and integration. In some embodiments, the power budget split can be selected by the application dynamically or by the external circuitry coupled to a power out pin and optimized to ensure the correct amount of power is delivered to the appropriate system, increasing overall system efficiency.

Switching the DC power output, as is disclosed with respect to some embodiments described herein, can be advantageous because it allows for directing all DC power output to one system or the other, increasing the sensitivity. In some embodiments, the switching can be based on a fixed time split for ease of integration by the user or can be based on a controllable split. In some embodiments, the time split can be controlled based on input circuit parameters, such as input power, allowing the circuit to optimize the exact amount of power going to support on-board RFID communications or external circuitry via a power out pin, thus increasing system efficiency without the need for input from external circuitry coupled to the Power Out. Alternatively, in some embodiments, the external circuitry could control the time split to allow for more customization. In some embodiments, the time duration that RFID communications are available can be controlled by controlling the time duration that power is provided to an RFID state machine. Additionally or alternative, in some embodiments, the time duration that power is available to external circuitry via a power out pin can be controlled by controlling the time duration that power is provided to the power out pin.

Splitting the RF power, as is disclosed with respect to some embodiments described herein, can allow for more customization by allowing the design of separate efficiencies, sensitivities, output powers, and voltages for both the RFID communications of the RFID state machine and the power out pin.

In some embodiments, the systems and methods described herein can control when the RFID communications of an RFID state machine are powered using an on-board power energy storage device that can receive energy (e.g., via a switch or splitter) to increase an energy storage level of the energy storage device. In some embodiments, energy (e.g., power outputted by an RF-to-DC converter) can then be stored in an energy storage device until an energy storage level of the energy storage device is sufficiently high to provide enough energy for RFID communications, at which time the energy stored in the energy storage device can be provided as power to the RFID state machine to support RFID communications. Such an RFID ASIC system can have drastically increased sensitivity compared to a system configured to operate based only on energy or power received in real time via an RF signal.

FIG. 1 is a schematic illustration of an RFID ASIC system 100. As shown in FIG. 1, RFID ASIC includes an antenna 110, analog circuitry 120 (also referred to as an analog front end), an RFID state machine 130, and an RF-to-DC converter 140. The analog circuitry 120 is operatively coupled to the antenna 110 and the RFID state machine 130. The RF-to-DC converter 140 is coupled in parallel to the analog circuitry 120, and the analog circuitry 120 is configured to couple the RF-to-DC converter 140 to the RFID state machine 130.

As shown, the system 100 can optionally include an impedance matching network 180 disposed between the antenna 110 and the analog circuitry 120 and the RF-to-DC converter 140. The impedance matching network 180 can be configured to receive an RF signal from the antenna 110 (also referred to as an RF input signal) and to provide an output based on the received RF signal to at least one of the analog circuitry 120 or the RF-to-DC converter 140. The impedance matching network 180 may be implemented using discrete components or by the design of the antenna.

The analog circuitry 120 includes a modulation circuit 122 and a demodulation circuit 124 (also referred to as a modulator and a demodulator, respectively). The demodulation circuit 124 is configured to demodulate a first portion of an RF signal received via the antenna 110 to produce a demodulated RF signal and to provide the demodulated RF signal to the RFID state machine 130. The modulation circuit 124 is configured to modulate an RF signal received from the RFID state machine 130 and to provide the modulated RF signal to the antenna 110 for transmitting as an outgoing RF signal (e.g., to an RFID interrogator).

The RFID state machine 130 includes a memory 136 (e.g., a user memory), an encoder 132 of outgoing data, and a decoder 134 of incoming data. The RFID state machine 130 is configured to receive the demodulated RF signal from the analog circuitry 120, to decode the demodulated RF signal to produce a decoded signal, and to generate an output signal based on the decoded signal. The output signal can be provided to an internal component of the system 100, such as the memory 136. In some embodiments, in response to the output signal, for example, the RFID state machine 130 can generate a signal to be transmitted that can be encoded by the encoder 132, modulated by the modulator 122, and transmitted as an outgoing RF signal by the antenna 110 (e.g., to an RFID interrogator) via backscatter. The memory 136 of the RFID state machine 130 can be accessed (e.g., for reading or writing) via an RFID interrogator (not shown in FIG. 1) and/or via in circuit communications (not shown in FIG. 1). The system 100 also includes a standard communications protocol interface 138 operably coupled to the RFID state machine 130.

The RF-to-DC converter 140 is configured to receive a second portion of the RF signal from the antenna 110 and to convert the second portion of the RF signal to a power associated with a direct current (DC) voltage. The RF-to-DC converter 140 can provide operative power to the RFID state machine 130. The RFID state machine 130 can operate based on the power provided by the RF-to-DC converter 140. For example, the RFID state machine 130 can decode (e.g., interpret) incoming data, encode outgoing data, and/or read from and/or write to the memory 136. In an alternative embodiment, a demodulation circuit can be included with the RF-to-DC converter rather than the demodulation circuit being included within the analog front end. In such an embodiment, the operative power provided by the RF-to-DC converter can be used to power the demodulation circuit.

Unlike as shown in FIG. 1, however, in some embodiments, as disclosed herein, a system (e.g., an RFID ASIC system) can provide DC power produced by an RF-to-DC converter for use by assemblies and devices external to the system via a system output (e.g., in addition to providing power produced by the RF-to-DC converter to an RFID state machine to power system communication-related operations).

Figure 2:
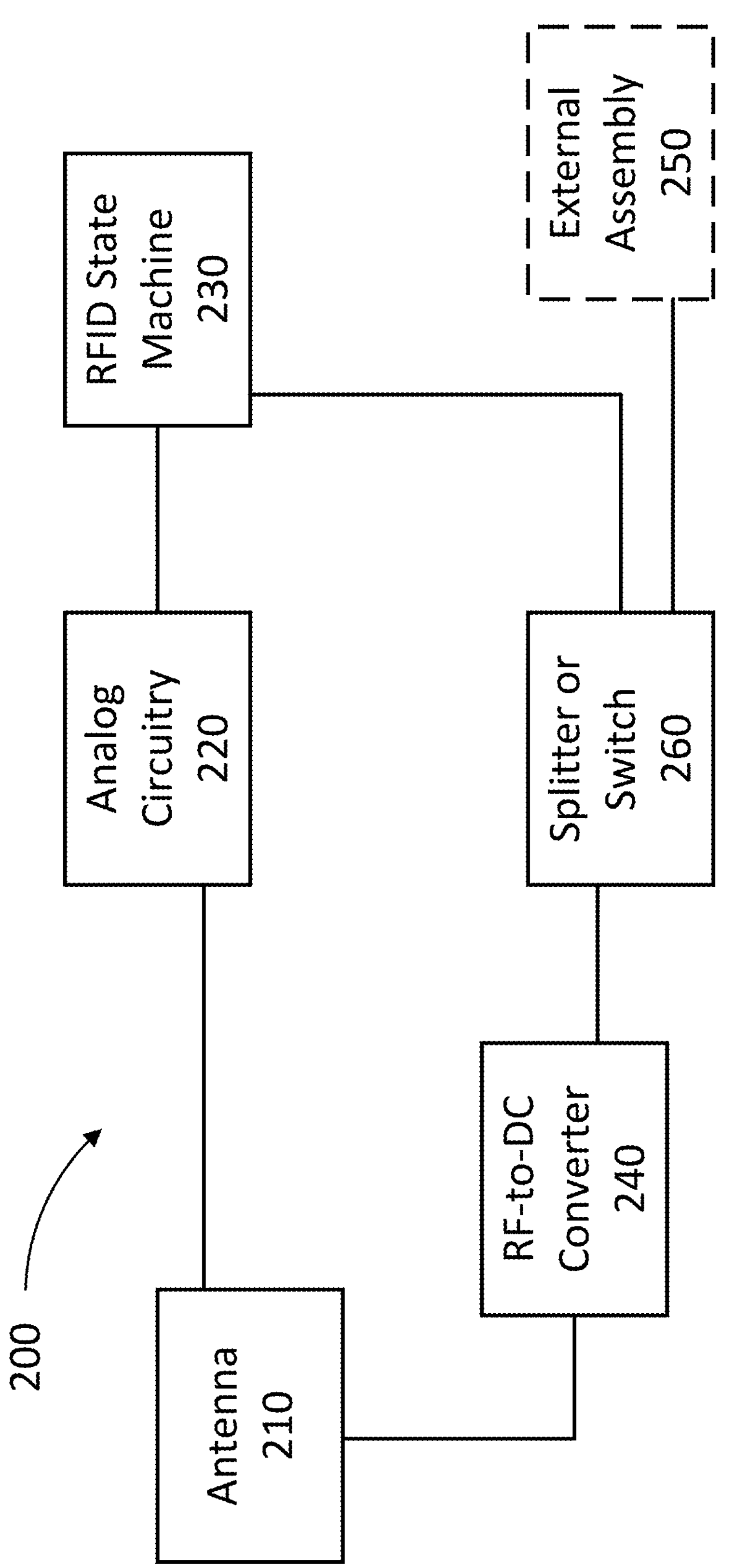
FIG. 2 is a schematic illustration of an RFID ASIC system, according to an embodiment.

In some embodiments, DC power produced by an RF-to-DC converter of an RFID ASIC system can be split between an RFID state machine (e.g., to be used as operative power for RFID communications) and an output (e.g., a power out pin) that is couplable to an external assembly (e.g., to provide power to the external assembly via the output). In some embodiments, the RF-to-DC converter can be located within the external assembly. For example, FIG. 2 is a schematic illustration of an RFID ASIC system 200 including a splitter or switch 260 coupled to an output of an RF-to-DC converter 240. The system 200 also includes an antenna 210, analog circuitry 220 (also referred to as an analog front end), and an RFID state machine 230 (also referred to as RFID communications circuitry).

The antenna 210, analog circuitry 220, the RFID state machine 230, and/or the RF-to-DC converter 240 can be the same or similar in structure and/or function to any similarly named components described herein, such as the antenna 110, the analog circuitry 120, the RFID state machine 130, and the RF-to-DC converter 140, respectively. For example, the analog circuitry 220 can include a modulator and/or a demodulator and can be operatively coupled to the antenna 210 and the RFID state machine 230, which can include an encoder, a decoder, and/or a memory. Additionally, the system 200 can optionally include an impedance matching network (not shown in FIG. 2) disposed between the antenna 210 and the analog circuitry 220 and/or the RF-to-DC converter 240. The impedance matching network can be configured to receive the RF signal from the antenna 210 and to send the RF signal to the analog circuitry 220 and the RF-to-DC converter 240. The system 200 can also include a standard communications protocol interface (not shown in FIG. 2) operably coupled to the RFID state machine 230.

The analog circuitry 220 can be configured to demodulate a first portion of an RF signal (also referred to as an RF power signal) received via the antenna 210 to produce a demodulated RF signal. The RFID state machine 230 can be configured to receive the demodulated RF signal from the analog circuitry 220, to decode the demodulated RF signal to produce a decoded signal, and to generate an output signal (e.g., used by the analog circuitry to communicate via backscatter) based on the decoded signal.

The RF-to-DC converter 240 is operatively coupled to the antenna 210. The RF-to-DC converter 240 is configured to receive a second portion of the RF signal from the antenna 210 and to convert the second portion of the RF signal to a power associated with a direct current (DC) voltage. The splitter or switch 260 is operatively coupled to the output of the RF-to-DC converter 240 and to an input of the RFID state machine 230. The splitter or switch 260 is also configured to be coupled an external assembly 250 including circuitry configured to be powered by and/or to store power received from the splitter or switch 260. The splitter or switch 260 is configured to receive the power from the RF-to-DC converter 240 and to provide the power to at least one of the RFID state machine 230 or the external assembly 250. The RFID state machine 230 and the external assembly 250 can each be configured to operate (at least in part) based on the power and in response to receiving the power. For example, in some embodiments, the RFID state machine 230 can initiate operating (e.g., turn on or awaken from a sleep state) in response to receiving power from the splitter or switch 260. In some embodiments, the RFID state machine 230 can decode a demodulated RF signal and/or generate an output signal based on the power received from the RF-to-DC converter 240 via the splitter or switch 260.

In some embodiments, the splitter or switch 260 can be configured to provide a first portion of the power received from the RF-to-DC converter 240 to the RFID state machine 230 and a second portion of the power received from the RF-to-DC converter 240 to the external assembly 250. In some embodiments, the splitter or switch 260 includes a splitter configured to simultaneously provide a first portion of the power received from the RF-to-DC converter 240 to the RFID state machine 230 and a second portion of the power received from the RF-to-DC converter 240 to the external assembly 250. In some implementations, the first portion of the power and the second portion of the power are equal in magnitude. In some implementations, the first portion of the power and the second portion of the power are unequal in magnitude.

In some embodiments, the splitter or switch 260 includes a splitter that can include, for example, include a resistive voltage divider and at least one capacitor. In some embodiments, the splitter or switch 260 includes a splitter that can include, for example, one or more current mirrors, voltage or current regulators, and/or power dividers including passive components. In some implementations, the splitter can include current mirrors with unity gain or non-unity gain to allow for an equal or unequal power split, respectively. In some implementations, the ratio of the power split by the splitter can be set using the gains of the respective current mirrors. The DC power may also be split using passive components such as a resistive voltage divider and capacitors. The DC power may also be split using switching devices, such as transistors, driven by a timer. The output of the transistors may be connected to a capacitor to keep a constant DC voltage. The period of the timer can be kept small enough to ensure a low enough ripple on the output of each transistor and the duty cycle will determine the power split. In some embodiments, the DC power can be split using DC/DC regulators at different output voltages or currents with the inputs tied to DC out and separate outputs, such as a low-dropout regulator (LDO), buck regulator, or boost regulator.

In some embodiments, the splitter or switch 260 includes a switch or splitter that can include one or more internal switching mechanisms or devices, such as one or more metal-oxide-semiconductor field-effect transistors (MOSFETs), bipolar junction transistors (BJTs), or relays. In some implementations, the splitter or switch 260 includes one or more direct current-to-direct current (DC-to-DC) converters. In some implementations, for example, the switch can include two internal or external DC-to-DC converters. Each DC-to-DC converter can include a respective selectively enabling circuitry configured such that only one of the two DC-to-DC converters is enabled at a time. Each of the DC-to-DC converters can include an output coupled to one of the RFID state machine 230 or the external assembly 250 (e.g., via a power out pin (not shown)).

In some embodiments, the splitter or switch 260 can be configured to provide the first portion of the power and the second portion of the power having a first ratio at a first time and a second ratio different from the first ratio at a second time. In some embodiments, the system 200 includes a timer coupled to the splitter or switch 260 and configured to send a timer signal to the splitter or switch 260 such that the splitter or switch 260 controls a ratio of the first portion of the power relative to the second portion of the power based on the timer signal. In some embodiments, the system 200 includes a timer coupled to the splitter or switch 260 and configured to send a timer signal to the splitter or switch 260 to cause the splitter or switch 260 to adjust a magnitude of one of the first portion of the power or the second portion of the power relative to the other of the first portion of the power or the second portion of the power based on the timer signal.

In some embodiments, the memory included in the RFID state machine 230 can be operatively coupled to the splitter or switch 260 and the splitter or switch 260 can be configured to provide the first portion of the power and the second portion of the power based on a ratio that is based on a user setting stored in the memory. In some embodiments, the splitter or switch 260 can be configured to provide the first portion of the power and the second portion of the power based on a position or orientation of an external analog or digital pin operatively coupled to the splitter or the switch 260. A first position or orientation of the external analog or digital pin can be associated with a first ratio of the first portion to the second portion or a first magnitude of the first portion or the second portion, and a second position or orientation of the external analog or digital pin can be associated with a second ratio of the first portion to the second portion or a second magnitude of the first portion or the second portion. In some embodiments in which the pin is an analog pin, the first portion of the power and second portion of the power can be dynamically changed or adjusted based on the applied magnitude on the analog pin.

In some embodiments, the splitter or switch 260 can be configured to provide the first portion of the power and the second portion of the power based on one or more characteristics of the power received from the RF-to-DC converter 240 (e.g., on a measured current, voltage, or amount of power provided or stored in an associated energy storage device). In some embodiments, the splitter or switch 260 can be configured to provide the first portion of the power and the second portion of the power based on input parameters of the system 200 and/or based on one or more characteristics of the RF signal received by the antenna 210.

In some embodiments, a magnitude of the first portion of the power is sufficient for the RFID state machine 230 to provide the output signal, and a magnitude of the second portion of the power includes a remainder of the power not included in the first portion of the power. In some embodiments, a magnitude of the second portion of the power is sufficient for the external assembly 250 to operate (e.g., complete an operation) based on the second portion of the power, and a magnitude of the first portion of power includes a remainder of the power not included in the second portion of the power.

Figure 3:
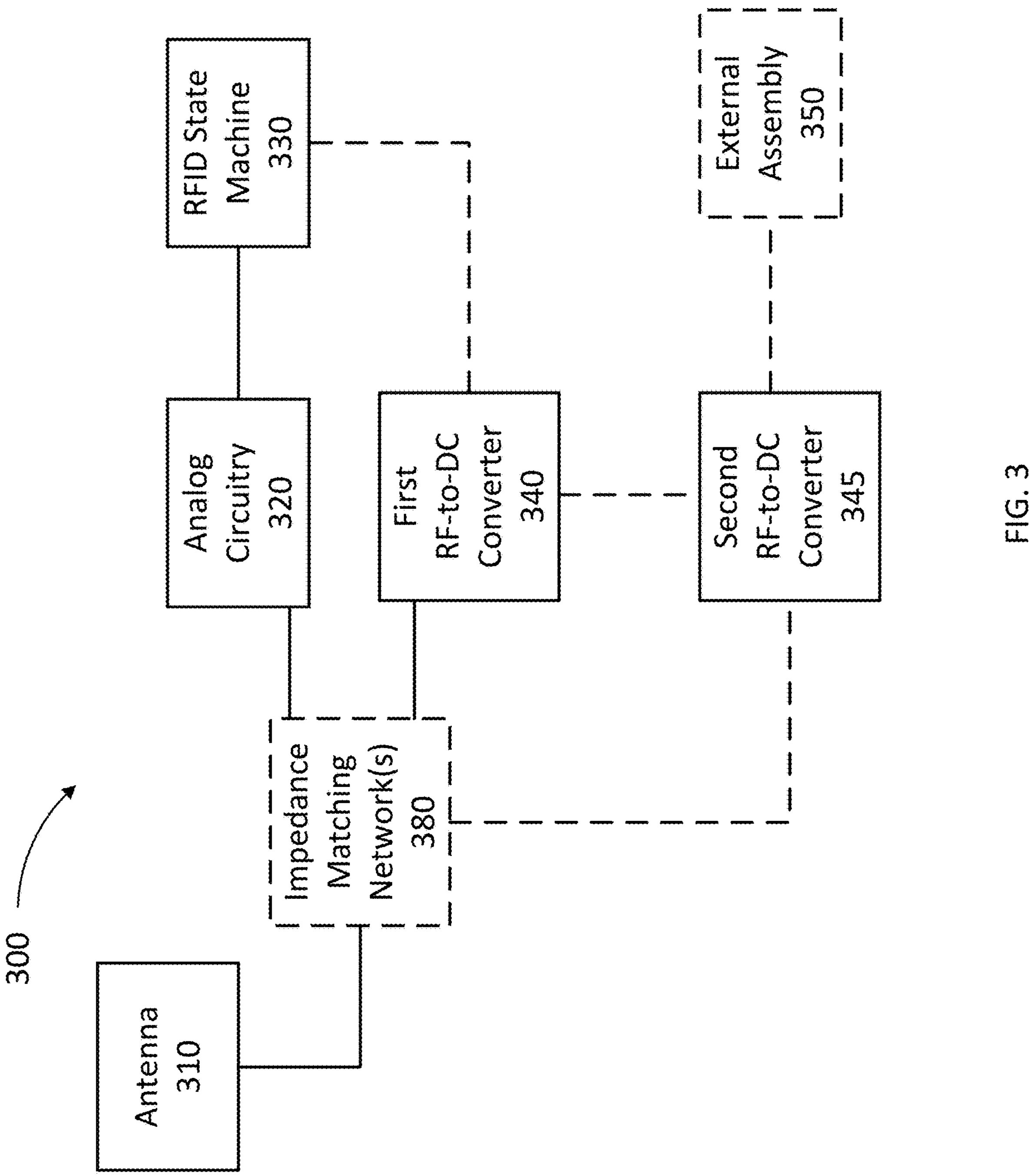
FIG. 3 is a schematic illustration of an RFID ASIC system, according to an embodiment.

In some embodiments, rather than including a splitter or switch, an RFID ASIC system can provide a first portion of DC power to an RFID state machine (e.g., to be used as operative power for RFID communications) and a second portion of DC power to an output (e.g., a power out pin) that is couplable to an external assembly (e.g., to provide power to the external assembly via the output) using two RF-to-DC converters coupled in parallel. For example, FIG. 3 is a schematic illustration of an RFID ASIC system 300 including a first RF-to-DC converter 340 and a second RF-to-DC converter 345. The system 300 also includes an antenna 310, analog circuitry 320 (also referred to as an analog front end), and an RFID state machine 330 (also referred to as RFID communications circuitry). The analog circuitry 320, the first RF-to-DC converter 340, and the second RF-to-DC converter 345 are each operatively coupled to the antenna 310 and coupled in parallel to one another. The first RF-to-DC converter 340 can have an impedance and the second RF-to-DC converter 345 can have an impedance that can be the same or different from the impedance of the first RF-to-DC converter 340.

The antenna 310, analog circuitry 320, the RFID state machine 330, and/or the RF-to-DC converters 340 and 345 can be the same or similar in structure and/or function to any similarly named components described herein, such as the antenna 110, the analog circuitry 120, the RFID state machine 130, and the RF-to-DC converter 140, respectively. For example, the analog circuitry 320 can include a modulator and/or a demodulator and can be operatively coupled to the antenna 310 and the RFID state machine 330, which can include an encoder, a decoder, and/or a memory. Additionally, the system 300 can optionally include an impedance matching network 380 disposed between the antenna 310 and the analog circuitry 320, the first RF-to-DC converter 340, and the second RF-to-DC converter 345. The impedance matching network 380 can be configured to receive an RF signal from the antenna 310 and to send the RF signal to the analog circuitry 320 and the RF-to-DC converters 340 and 345. The system 300 can also include a standard communications protocol interface (not shown in FIG. 3) operably coupled to the RFID state machine 330.

Similarly as described above with respect to systems 100 and 200, the analog circuitry 320 can be configured to demodulate a first portion of an RF signal (also referred to as an RF power signal) received via the antenna 310 to produce a demodulated RF signal. The RFID state machine 330 can be configured to receive the demodulated RF signal from the analog circuitry 320, to decode the demodulated RF signal to produce a decoded signal, and to generate an output signal (e.g., used by the analog circuitry to communicate via backscatter) based on the decoded signal.

The first RF-to-DC converter 340 is configured to receive a second portion of the RF signal from the antenna 310 and to convert the second portion of the RF signal to a first power associated with a direct current (DC) voltage. The second RF-to-DC converter 345 is configured to receive a third portion of the RF signal from the antenna 310 and to convert the third portion of the RF signal to a second power associated with a direct current (DC) voltage. The second portion of the RF signal can be at a first frequency or a first frequency range, and the third portion of the RF signal can be at a second frequency or a second frequency range. The second frequency and the second frequency range can be different than the first frequency and the first frequency range, respectively. The first RF-to-DC converter 340 can be configured to provide the first power to the RFID state machine 330 via an output of the first RF-to-DC converter 340 coupled to an input of the RFID state machine 330. The second RF-to-DC converter 345 can be configured to be coupled to and provide the second power to an external assembly 350 via an output of the second RF-to-DC converter 345 coupled to an output interface (e.g., a power out pin) couplable to the external assembly 350. The external assembly 350 can be the same or similar in structure and/or function to any of the external assemblies described herein.

In some embodiments, the system 300 can include a splitter (not shown in FIG. 3) coupled to the analog circuitry 320, the first RF-to-DC converter 340, and the second RF-to-DC converter 345. The splitter can be configured to receive the second portion and the third portion of the RF signal from the antenna 310 and provide the second portion of the RF signal to the first RF-to-DC converter 340 and the third portion of the RF signal to the second RF-to-DC converter 345. The second portion of the RF signal can be at a first frequency or a first frequency range, and the third portion of the RF signal can be at a second frequency or a second frequency range. The second frequency and the second frequency range can be different than the first frequency and the first frequency range, respectively. In some implementations, the first portion of the RF signal and the second portion of the RF signal are equal. In some implementations, the first portion of the RF signal and the second portion of the RF signal are unequal. The splitter can operate to split the RF signal to provide a particular ratio or magnitude of the second portion and the third portion of the RF signal similarly as described with respect to any splitter or switch described herein.

In some embodiments, rather than including a second RF-to-DC converter 345, the first RF-to-DC converter 340 can be a multi-stage converter having at least one first stage and at least one second stage. The first RF-to-DC converter 340 can be configured to receive a second portion of the RF signal from the antenna 310. The first stage of the RF-to-DC converter 340 can convert a first portion of the second portion of the RF signal received from the antenna 310 to a first power associated with a direct current (DC) voltage. The second stage of the RF-to-DC converter 340 can convert a second portion of the second portion of the RF signal received from the antenna 310 to a second power associated with a DC voltage. The RF-to-DC converter 340 can include a first output or tap between the first stage and the second stage coupled to the RFID state machine 330 such that the first power can be provided to the RFID state machine 330 and a second output or tap after the second stage coupled to an output or tap couplable to the external assembly 350 such that the second power can be provided to the external assembly 350.

Figure 4:
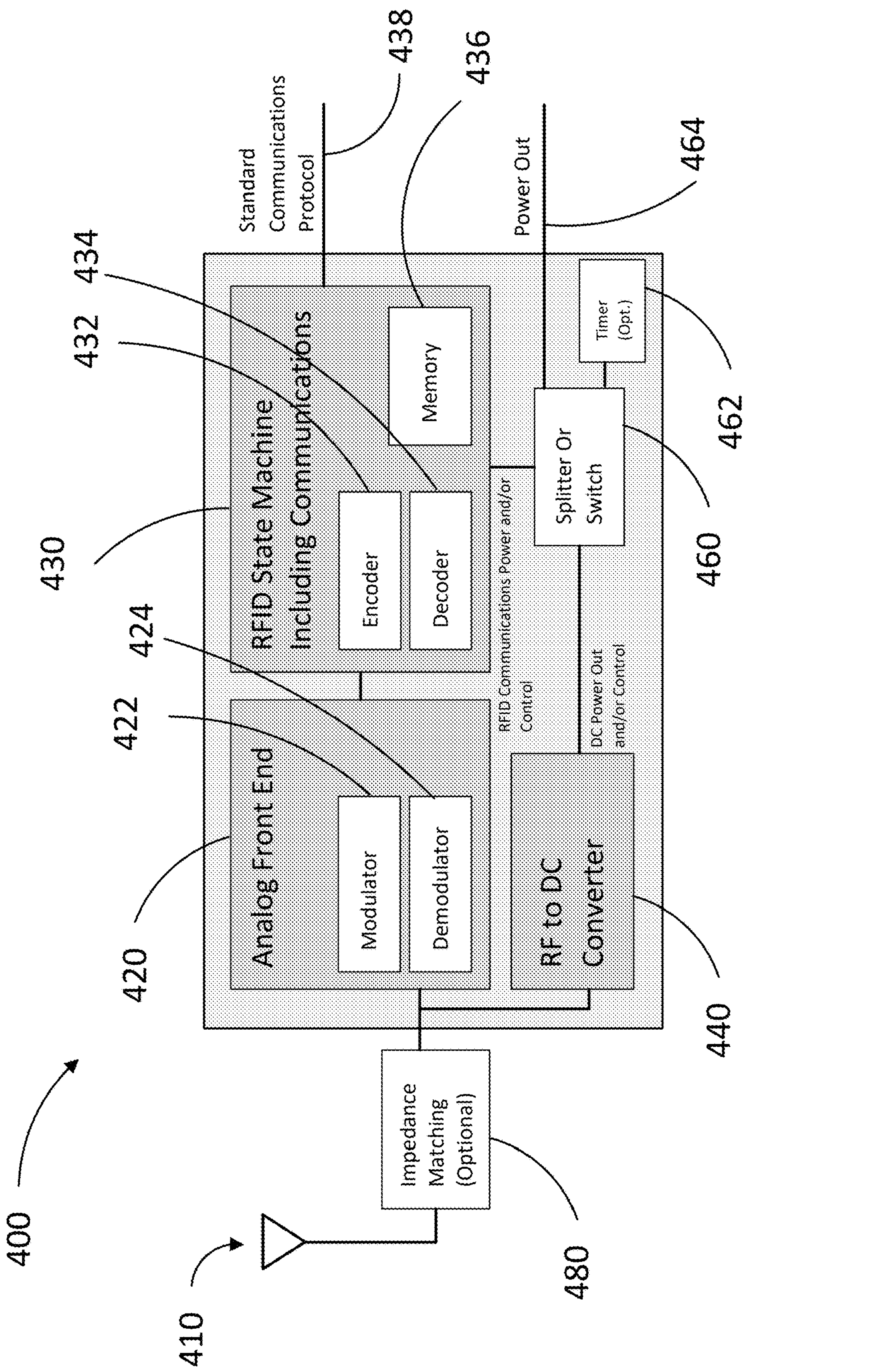
FIG. 4 is a schematic illustration of an RFID ASIC system, according to an embodiment.

FIG. 4 is a schematic illustration of an RFID ASIC system 400 including a splitter or switch 460 configured to split DC power produced by an RF-to-DC converter. The system 400 can include an antenna 410, analog circuitry 420 (also referred to as an analog front end), an RFID state machine 430, and an RF-to-DC converter 440. The antenna 410, analog circuitry 420, the RFID state machine 430, and/or the RF-to-DC converter 440 can be the same or similar in structure and/or function to any similarly named components described herein, such as the antenna 210, the analog circuitry 220, the RFID state machine 230, and the RF-to-DC converter 240, respectively. For example, the analog circuitry 420 includes a modulator 422 and a demodulator 424 and is operatively coupled to the antenna 410 and the RFID state machine 430, which includes an encoder 432, a decoder 434, and a memory 436. As shown, the system 400 can optionally include an impedance matching network 480 disposed between the antenna 410 and the analog circuitry 420 and/or the RF-to-DC converter 440. The system 400 also includes a standard communications protocol interface 438 operably coupled to the RFID state machine 430.

As shown in FIG. 4, the splitter or switch 460 can be included downstream of the RF-to-DC converter 440 and is configured to control division of power produced by the RF-to-DC converter 440 between an RFID state machine 430 and a power out pin 464. In some implementations, splitting DC power can allow for DC power to be provided to the RFID state machine 430 and the power out pin 464 simultaneously (e.g., both the RFID communications performed by the RFID state machine 430 and a function performed by an external assembly coupled to the power out pin 464 can be operated based on the DC power simultaneously).

In some implementations, the splitter 460 can include one or more current mirrors, voltage or current regulators, and/or power dividers including passive components. In some implementations, the splitter 460 can include current mirrors with unity gain or non-unity gain to allow for an equal or unequal power split, respectively. In some implementations, the ratio of the power split by the splitter 460 can be set using the gains of the respective current mirrors. The DC power may also be split using passive components such as a resistive voltage divider and capacitors. The DC power may also be split using switching devices, such as transistors, driven by a timer 462. The output of the transistors may be connected to a capacitor to keep a constant DC voltage. The period of the timer 462 can be kept small enough to ensure a low enough ripple on the output of each transistor and the duty cycle will determine the power split. In some embodiments, the DC power can be split using DC/DC regulators at different output voltages or currents with the inputs tied to DC out and separate outputs, such as a low-dropout regulator (LDO), buck regulator, or boost regulator.

Figure 5:
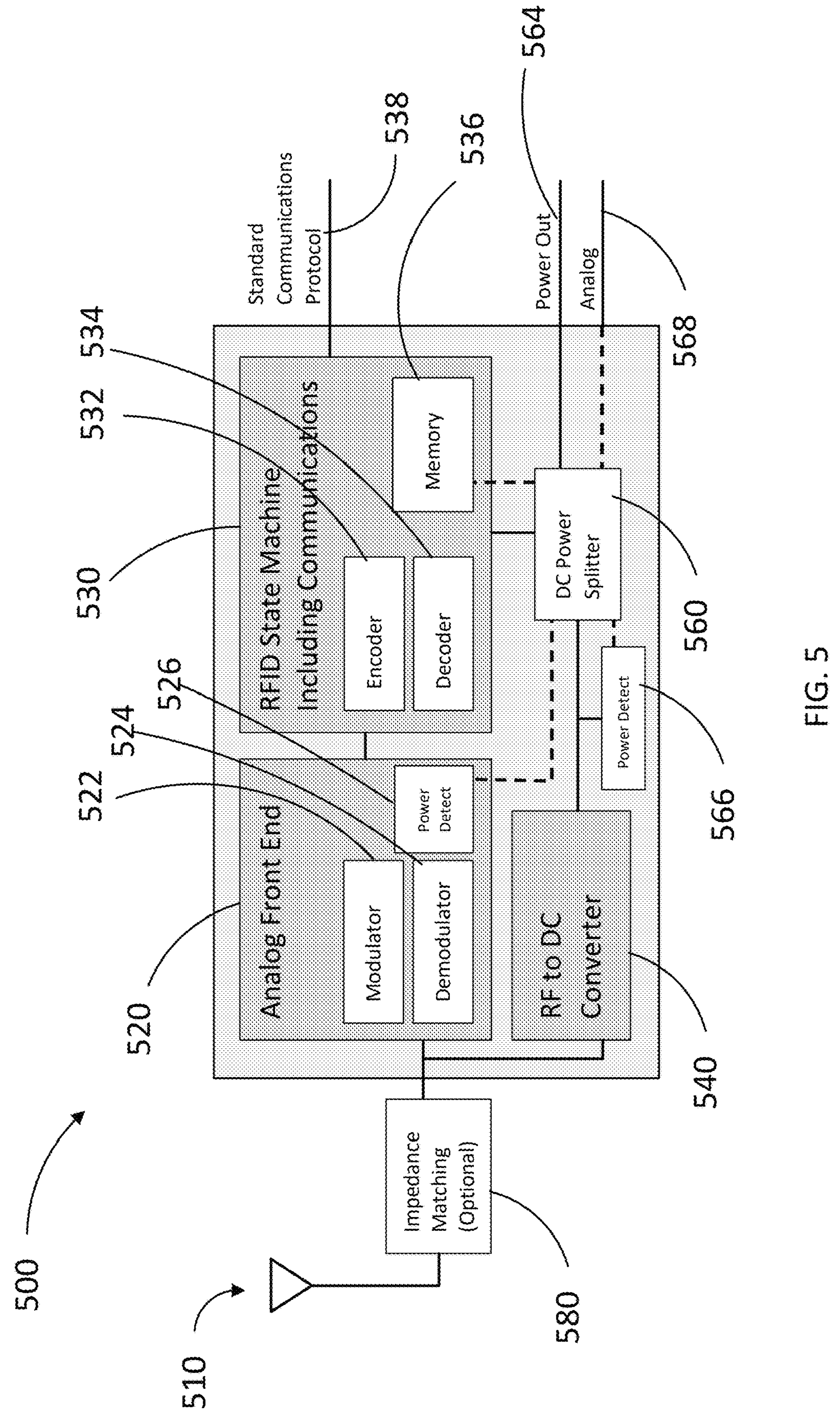
FIG. 5 is a schematic illustration of an RFID ASIC system, according to an embodiment.

In some embodiments, as described above, DC power produced by an RF-to-DC converter can be split evenly or unevenly. For example, in some embodiments, DC power produced by an RF-to-DC converter of an RFID ASIC system can be split evenly or unevenly such that a greater amount of the power produced by the RF-to-DC converter is provided for use as on-board power (e.g., by an RFID state machine) than is supplied to an external assembly via a power out pin, or vice versa. As shown in FIG. 5, for example, an RFID ASIC system 500 can include an antenna 510, analog circuitry 520 (also referred to as an analog front end), an RFID state machine 530, and an RF-to-DC converter 540. The antenna 510, analog circuitry 520, the RFID state machine 530, and/or the RF-to-DC converter 540 can be the same or similar in structure and/or function to any similarly named components described herein, such as the antenna 210, the analog circuitry 220, the RFID state machine 230, and the RF-to-DC converter 240, respectively. For example, the analog circuitry 520 includes a modulator 522 and a demodulator 524 and is operatively coupled to the antenna 510 and the RFID state machine 530, which includes an encoder 532, a decoder 534, and a memory 536. As shown, the system 500 can optionally include an impedance matching network 580 disposed between the antenna 510 and the analog circuitry 520 and/or the RF-to-DC converter 540. The system 500 also includes a standard communications protocol interface 538 operably coupled to the RFID state machine 530.

As shown in FIG. 5, the system 500 includes a DC power splitter 560 and a power out pin 564 coupled to the DC power splitter 560. The DC power produced by the RF-to-DC converter 540 can be split evenly or unevenly by the DC power splitter 560 such that a first portion of the DC power is provided to the RFID state machine 530 and a second portion of the DC power is provided to the power out pin 564.

In some embodiments, the DC power split (e.g., the ratio of the first portion of the DC power to the second portion of the DC power) can be unchangeable by the user. For example, the split can be set during a design and/or manufacturing stage of the system 500. In some variations, the percentage of DC power supplied to the RFID state machine 530 and the percentage of DC power supplied to the power out pin 564 can be selected to improve (or optimize for) the distance from an RFID interrogator (not shown in FIG. 5) that the power out pin 564 and/or communication provided via the RFID state machine 530 (in combination with the communications protocol interface 538 or the antenna 510)

is available. For example, the percentage of DC power supplied to each of the RFID state machine 530 and the power out pin 564 can be selected such that the RFID state machine 530 receives sufficient power to communicate via the antenna 510 with an RFID interrogator a particular distance or within a particular distance range away from the system 500, and any additional DC power produced by the RF-to-DC converter 540 can be supplied to the power out pin 564 rather than providing excess power to the RFID state machine 530 that is unnecessary to reach a target region or range within which the RFID interrogator is disposed.

In some implementations, the DC power split can be adjustable by a user. In some variations, the DC power split can be determined in application by a user and can be an equal or unequal split. In some variations, the amount of power supplied to each of the RFID state machine 530 and the power out pin 564 can be set in a user memory 536 of the RFID state machine 530. In some implementations, either an RFID interrogator (not shown in FIG. 5) or an on-board communications protocol interface 538 can write to the user memory 536 and adjust the power split. For example, on initial powerup of the system 500, the applicable field in user memory 536 can be read (e.g., by a processor that controls the splitter 560, such as a processor of the RFID state machine 530 or a processor of the splitter 560) and the power split of the DC power splitter 560 can be adjusted accordingly. In some variations, the DC power splitter can maintain that power split until the system 500 (e.g., the RF-to-DC converter 540) runs out of power, essentially causing the DC power splitter to reset. In some variations, the power split stored in the user memory 536 can be read periodically during operation of the system 500 (e.g., on the expiration of a timer) allowing the user to adjust the power split during the operation of the system 500.

In some embodiments, in addition to or as an alternative to user memory, the power split of the DC power splitter can be set by adjustment of an external analog pin 568. The DC value present on the pin 568 can be associated with the power split between the RFID state machine 530 and the power out pin 564 such that the power split is determined based on the orientation of the pin 568. In some variations, setting of the DC split can be determined based on the orientation of the pin 568 at power up of the system 500. In some variations, the split of the DC power splitter 560 can be adjusted periodically (e.g., at the expiration of an internal timer) based on the orientation of the pin 568 at periodic intervals so that the split can be adjusted by the user via adjustment of the pin 568.

In some embodiments, DC power can be split by the DC power splitter 560 dynamically. Rather than the power split being determined by or adjustable by the user, the power split of the DC power splitter 560 can be based on input parameters associated with the RF signal received by the antenna 510 and/or input parameters associated with the DC power supplied by the RF-to-DC converter 540 to the DC power splitter 560, and the split can change automatically if the input parameters changed. For example, in some variations, a power detector 566 can read the power at the output of the RF-to-DC converter 540 and the power available to be split by the DC power splitter 560 can be determined based on the power at the output of the RF-to-DC converter 540. The power detector 566 can include, for example, a comparator, supervisor, current sensor amplifier, and/or any other suitable device. Alternatively, in some variations, a power detector 526 can read the power at the input of the RF-to-DC converter 540 and the power available to be split by the DC power splitter 560 can be determined based on the power at the input of the RF-to-DC converter 540. The power detector 526 can include, for example, an envelope detector, a secondary RF-to-DC converter, a coupler, and/or any other suitable device. Based on the power measurement of the power detector 566 and/or the power detector 526, the ratio of power provided by the DC power splitter 560 to the RFID state machine 530 and the power out pin 564 can be adjusted dynamically (e.g., in view of design parameters of the system 500).

In some implementations, the DC power splitter 560 can be configured to dynamically split the power received from the RF-to-DC converter 540 between the RFID state machine 530 and the power out pin 564 such that the amount of power provided to the RFID state machine 530 is the minimum amount necessary for the RFID state machine 530 to fully operate (e.g., communicate), and the remainder of the power provided to the DC power splitter 560 is provided to the power out pin 564. Since the total amount of power available to the RFID ASIC is dependent upon outside parameters, such as distance from the RFID interrogator, the amount of power included in a first portion of power supplied by the DC power splitter 560 and directed to the RFID state machine 530 to support communication operations can be fixed, regardless of distance of the system 500 (e.g., of the antenna 510) from the RFID interrogator, to ensure the power available to the RFID state machine 530 remains constant and sufficient for the RFID state machine 530 to operate. A second portion of the power supplied by the DC power splitter 560 and directed to the power out pin from the DC power splitter 560 can vary. In some embodiments, the amount of power required by the RFID state machine 530 to operate can be identified during design and/or testing of the system 500.

In some embodiments, the DC power splitter 560 can be configured to dynamically split the power received from the RF-to-DC converter 540 between the RFID state machine 530 and the power out pin 564 such that the amount of power provided to the power out pin 564 is held constant, regardless of external conditions, and the amount of power directed to the RFID state machine 530 is varied. The amount of power to be maintained to the power out pin 564 can be settable by the user in the user memory 536 (e.g., by an RFID interrogator, external on-board communication protocol interface(s), and/or an analog or digital pin such as pin 568). The power setting indicating the amount of power to be maintained to the power out pin 564 can be checked by a processor associated with control of the splitter 560 at power up of the system 500 and/or at expiration of a timer of the system 500 (e.g., an on-chip timer). The DC power splitter 560 can dynamically adjust the ratio of a first amount of power provided to the RFID state machine 530 to a second amount of power provided to the power out 564 such that the second amount of power remains constant, while the first amount of power varies (e.g., includes the remainder of power provided to the DC power splitter 560 by the RF-to-DC converter 540).

In some embodiments, the splitter 560 can include one or more internal switching mechanisms or switching devices, such as one or more MOSFETs. The system 500 (e.g., the splitter 560) can optionally include one or more DC-to-DC converters (e.g., two internal or external DC-to-DC converters). Each DC-to-DC converter can include a respective selectively enabling circuitry configured such that only one of the DC-to-DC converters is enabled at a time. Each of the DC-to-DC converters can include an output coupled to one of the RFID state machine 530 or the power out pin 564.

Figure 6:
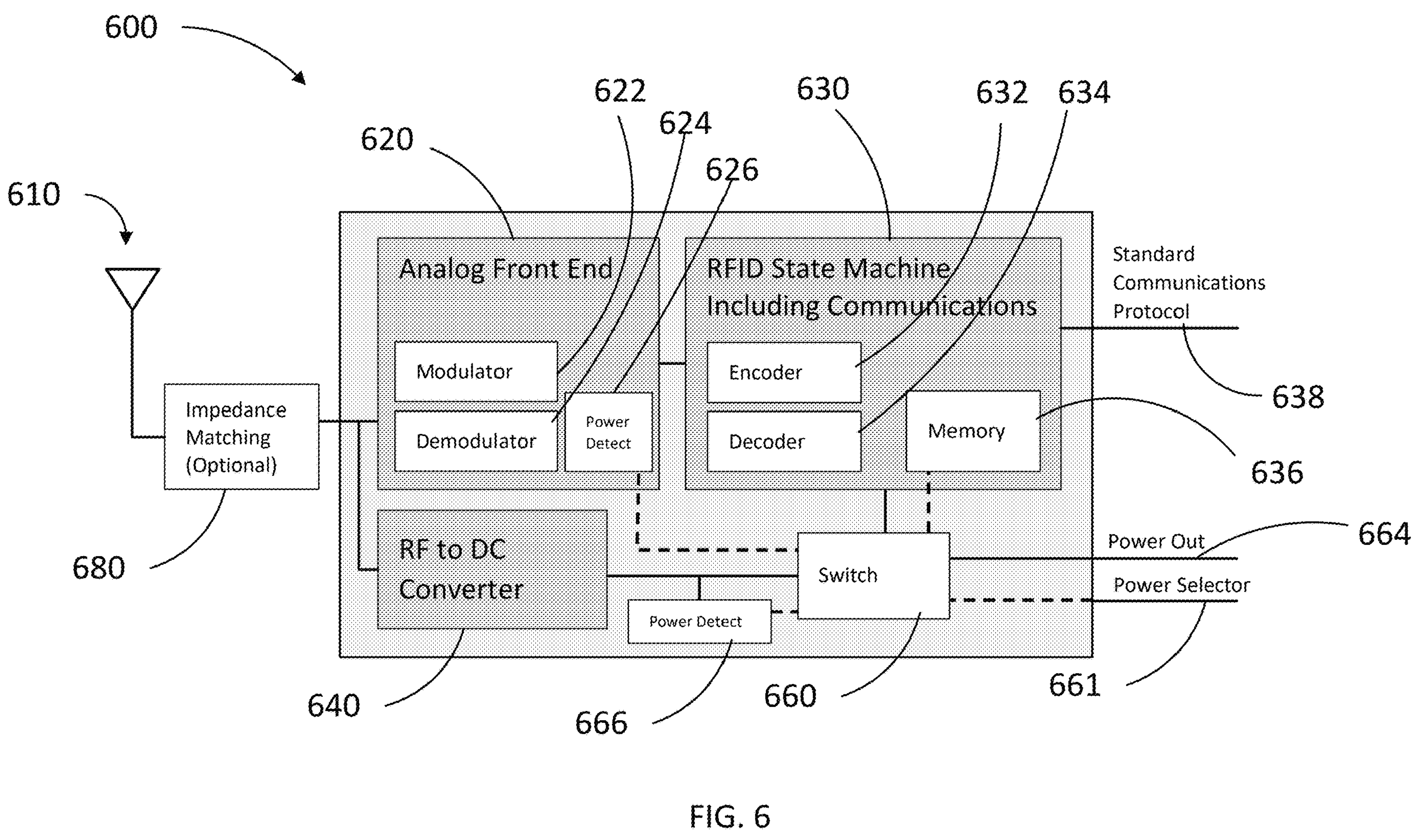
FIG. 6 is a schematic illustration of an RFID ASIC system, according to an embodiment.

In some embodiments, power converted by an RF-to-DC converter can be alternatively provided to an RFID state machine or a power out pin based on time. For example, FIG. 6 is a schematic illustration of an RFID ASIC system 600 including an antenna 610, analog circuitry 620 (also referred to as an analog front end), an RFID state machine 630, and an RF-to-DC converter 640. The antenna 610, analog circuitry 620, the RFID state machine 630, and/or the RF-to-DC converter 640 can be the same or similar in structure and/or function to any similarly named components described herein, such as the antenna 210, the analog circuitry 220, the RFID state machine 230, and the RF-to-DC converter 240, respectively. For example, the analog circuitry 620 includes a modulator 622 and a demodulator 624 and is operatively coupled to the antenna 610 and the RFID state machine 630, which includes an encoder 632, a decoder 634, and a memory 636. As shown, the system 600 can optionally include an impedance matching network 680 disposed between the antenna 610 and the analog circuitry 620 and/or the RF-to-DC converter 640. The system 600 also includes a standard communications protocol interface 638 operably coupled to the RFID state machine 630, a switch 660 (also referred to as a DC power switching mechanism), and a power out pin 664 coupled to the switch 660.

Power converted by the RF-to-DC converter 640 can be alternatively provided to the RFID state machine 630 or the power out pin 664 based on time. In some implementations, rather than a power splitter splitting a power received from the RF-to-DC converter 640 into a first portion and a second portion that are provided concurrently to the RFID state machine 630 and the power out pin 664, respectively, the switch 660 can alternatively provide power to the RFID state machine 630 or the power out pin 664. For example, the switch 660 can provide power to the RFID state machine 630 (and not to the power out pin 664) for a first duration of time during a first time period and can provide power to the power out pin 664 (and not the RFID state machine 630) for a second duration during a second time period. The second duration of time can be the same or different (e.g., shorter or longer) than the first duration of time and the second time period can be non-overlapping with the first time period. Thus, the switch 660 can provide power received from the RF-to-DC converter 640 to the RFID state machine 630 or the power out pin 664 at a given time, but not to both simultaneously. Although power supplied by the RF-to-DC converter 640 is intermittently available to the RFID state machine 630 and to the power out pin 664, since power is directed entirely to one of the RFID state machine 630 or the power out pin 664, an overall sensitivity of the system 600 can be increased compared to a system in which a DC power splitter splits power and provides the power to a RFID state machine and a power out concurrently (e.g., the system 500).

In some implementations, the switch 660 can selectively direct power to the RFID state machine 630 or the power out 664 based on a status of a user control, one or more internal and/or external timers, and/or based on device input parameters. For example, in some implementations, the switch 660 can include one or more internal switching mechanisms or switching devices, such as one or more MOSFETs, BJTs, or relays. The system 600 (e.g., the switch 660) can optionally include one or more internal and/or external capacitors, inductors, batteries, and/or other energy storage devices operably coupled to the output of the one or more internal switching mechanisms to improve DC power performance. In some implementations, the switch 660 can include one or more DC-to-DC converters (e.g., two internal or external DC-to-DC converters). Each DC-to-DC converter can include a respective selectively enabling circuitry configured such that only one of the DC-to-DC converters is enabled at a time. Each of the DC-to-DC converters can include an output coupled to one of the RFID state machine 630 or the power out pin 664.

In some implementations, the switch 660 can have a first state in which the switch 660 directs all DC power received from the RF-to-DC converter 640 to the RFID state machine 630 for a first time period. Upon determining that an operation of the RFID state machine 630 (e.g., communication between the system 600 and an RFID interrogator or on-board communications of the system 600) has completed or that sufficient energy has been stored in an energy storage device (not shown in FIG. 6) of the system 600 for the operation (e.g., a communication operation) to complete using the stored energy, the switch 660 can transition from the first state to a second state in which the switch 660 directs all DC power received from the RF-to-DC converter 640 to the power out pin 664.

In some implementations, a processor associated with the switch 660 and included in the system 600 can monitor communications of the system 600 to determine if RFID communication operation(s) of the system 600 have completed. During a period of time in which a communication operation of the system has not completed (e.g., is ongoing), the switch 660 can direct all of the power received from the RF-to-DC converter 640 to the RFID state machine 630 and none of the power received from the RF-to-DC converter 640 to the power out pin 664. In response to a determination by the processor associated with the switch 660 that an RFID interrogator or an on-board communication component has released control (e.g., ceased communication with or within the system 600), the switch 660 can transition (e.g., under the control of the processor) from directing power to the RFID state machine 630 to directing all of the power received from the RF-to-DC converter 640 to the power out pin 664.

In some implementations, a processor associated with the switch 660 and included in the system 600 can monitor the memory 636 (e.g., continuously or at preset intervals) for the presence of a flag bit indicating that a communication operation has finished. During a period of time in which a flag bit is not detected in the memory 636, the switch 660 can direct all of the power received from the RF-to-DC converter 640 to the RFID state machine 630 and none of the power received from the RF-to-DC converter 640 to the power out pin 664. An RFID interrogator and/or an on-board communication component can set (or cause to set) a flag bit in the memory 536 indicating that a communication operation has finished. In response to detection of the flag bit in the memory 636 by the processor associated with the switch 660, the switch 660 can transition (e.g., under the control of the processor) from directing power to the RFID state machine 630 to directing all of the power received from the RF-to-DC converter 640 to the power out pin 664.

In some implementations, as described above, the system 600 can include one or more energy storage devices (not shown in FIG. 6), and the RFID state machine 630 can be configured to operate (e.g., perform RFID communication operations) using energy stored in the one or more energy storage devices in addition to or as an alternative to operating using energy directly provided to the RFID state machine 630 by the switch 660. The one or more energy storage devices can include, for example, one or more capacitors, inductors, and/or batteries. The system 600 can include any suitable component configured to monitor the one or more energy storage devices to determine if sufficient energy has been stored to power a communication operation or a remainder of a communication operation of the system 600. For example, the monitoring component (not shown in FIG. 6) can monitor whether an amount of energy stored in the one or more energy storage devices is above or below a threshold energy storage level, the threshold associated with an amount of energy necessary to complete a communication operation. The monitoring component can include, for example, one or more voltage supervisors, comparators, current sensors, or analog-to-digital converters. Similarly as described above with respect to the system 500, the system 600 can include a power detector 666 and/or a power detector 626 configured to measure power levels within the system 600 and the switch 660 can transition between providing power to the RFID state machine 630 or the power out pin 664 based on the power measurements.

During a period of time in which the one or more energy storage devices are determined to have a stored energy level below the threshold energy storage level, the switch 660 can direct all of the power received from the RF-to-DC converter 640 to the RFID state machine 630 and/or the one or more energy storage devices and none of the power received from the RF-to-DC converter 640 to the power out pin 664. In response to detection of the stored energy level being at or above the threshold energy storage level and before or after communication has taken place, the switch 660 can transition from directing power to the RFID state machine 630 and/or to the one or more energy storage devices to directing all of the power received from the RF-to-DC converter 640 to the power out pin 664. Since the amount of available energy converted by the RF-to-DC converter 640 depends on external parameters, such as distance of an RFID interrogator sending an RF signal to the antenna 610, the time used to charge the one or more energy storage devices can vary based on the external parameters and parameters of the RF signal received at the antenna 610, but the system 600 can ensure that communication operations are always prioritized to be completed first (e.g., before providing power to the power out pin 664), regardless of the external parameters and parameters of the RF signal received at the antenna 610.

In some implementations, the switch 660 can transition from providing power only to the power out pin 664 to providing power to only the RFID state machine 630 and/or the energy storage device to power RFID communication operation(s) in response to sufficient energy having been provided to the power out pin 664. In some embodiments, the transition of the switch 660 from providing power only to the power out pin 664 to providing power to only the RFID state machine 630 and/or the energy storage device can be controlled based on an amount of power delivered to a power out pin 661 (also referred to as a power selector) of the system 600. In some implementations, a current sense detector (not shown in FIG. 6) can be used to monitor a current of the power delivered to the power out pin 661 if power is provided by the switch 660 to the power out pin 664 to directly power an external device operably coupled to the power out pin 664. In some implementations, a comparator or voltage supervisor (not shown in FIG. 6) can be used to monitor a voltage of the power delivered to the power out pin 661 if power is provided by the switch 660 to the power out pin 664 to provide energy for storage in an energy storage device (e.g., a capacitor, inductor, or battery) of an external device operably coupled to the power out pin 664.

In some embodiments, the transition of the switch 660 from providing power only to the power out pin 664 to providing power to only the RFID state machine 630 and/or the energy storage device can be controlled based on time. For example, the power can be switched from the power out pin 664 back to the RFID state machine 630 upon expiration of an internal timer of the switch 660 or under the control of external circuitry that sets a flag in the memory 636 via an on-board communication protocol interface 638.

In some implementations, the system 600 can be configured such that the switch 660 defaults to providing power to the RFID state machine 630 and/or the energy storage device(s) configured to supply power to the RFID state machine 630 when the system 600 is initially powered up. Thus, to transition the switch 660 from providing power only to the power out pin 664 to providing power to only the RFID state machine 630 and/or the energy storage device, the system 600 can be allowed to run out of accessible power (e.g., on-board stored power in one or more energy storage devices of the system 600) such that the system 600 transitions to a non-operational mode. In response to sufficient power being provided to the system 600 (e.g., via energy of an RF signal received at the antenna 610 and at least partially converted by the converter 640) for the system 600 to transition to an operational mode, the switch 660 can automatically reset to provide power received from the RF-to-DC converter 640 to the RFID state machine 630 and/or the one or more energy storage devices associated with the RFID state machine 630 and to not provide power to the power out pin 664.

Conversely, in some implementations, the switch 660 can be configured to first direct power received from the RF-to-DC converter 640 to the power out pin 664 and to transition to provide power received from the RF-to-DC converter 640 to the RFID state machine 630 in response to determining that sufficient energy has been delivered to the power out pin 664. In some embodiments, a user can set and change which of the RFID state machine 630 or the power out pin 664 receives power from the switch 660 first via interacting with the memory 636 using an RFID interrogator or via the onboard communications protocol interface 638.

In some embodiments, the flow of power can be controlled using an external general-purpose input/output (GPIO) port (or pin) (not shown in FIG. 6) having a logic level directing all power received from the RF-to-DC converter 640 to the RFID state machine 630 and an inverse logic level directing all power received from the RF-to-DC converter 640 to the power out pin 664. The GPIO port can be included, for example, in the switch 660. The assignment of the logic low to directing power to the power out pin 664 or the RFID state machine 630 can be set during design, during manufacturing, and/or be settable by a user in the memory 636 (e.g., via an RFID interrogator or the onboard communication protocol interface 638). Thus, the default assignment and power flow at power up of the system 600 can be settable.

In some implementations, all power received from the RF-to-DC converter 640 can be directed to the power out pin via a logic low on the GPIO port. The external circuitry can use or store the power. In response to the external circuitry using or storing the power, the external circuitry can update the memory 636 with new data, such as new sensor data reads, and then set the GPIO port high such that all power received from the RF-to-DC converter 640 is directed to the RFID state machine 630 and an RFID interrogator can access the memory 636 and read the new sensor data.

In some implementations, the GPIO port may be analog in nature. The external circuitry can control the value supplied to GPIO port to adjust the ratio of power received from the RF-to-DC converter 640 and directed between the RFID state machine 630 and the power out pin 664

Figure 7:
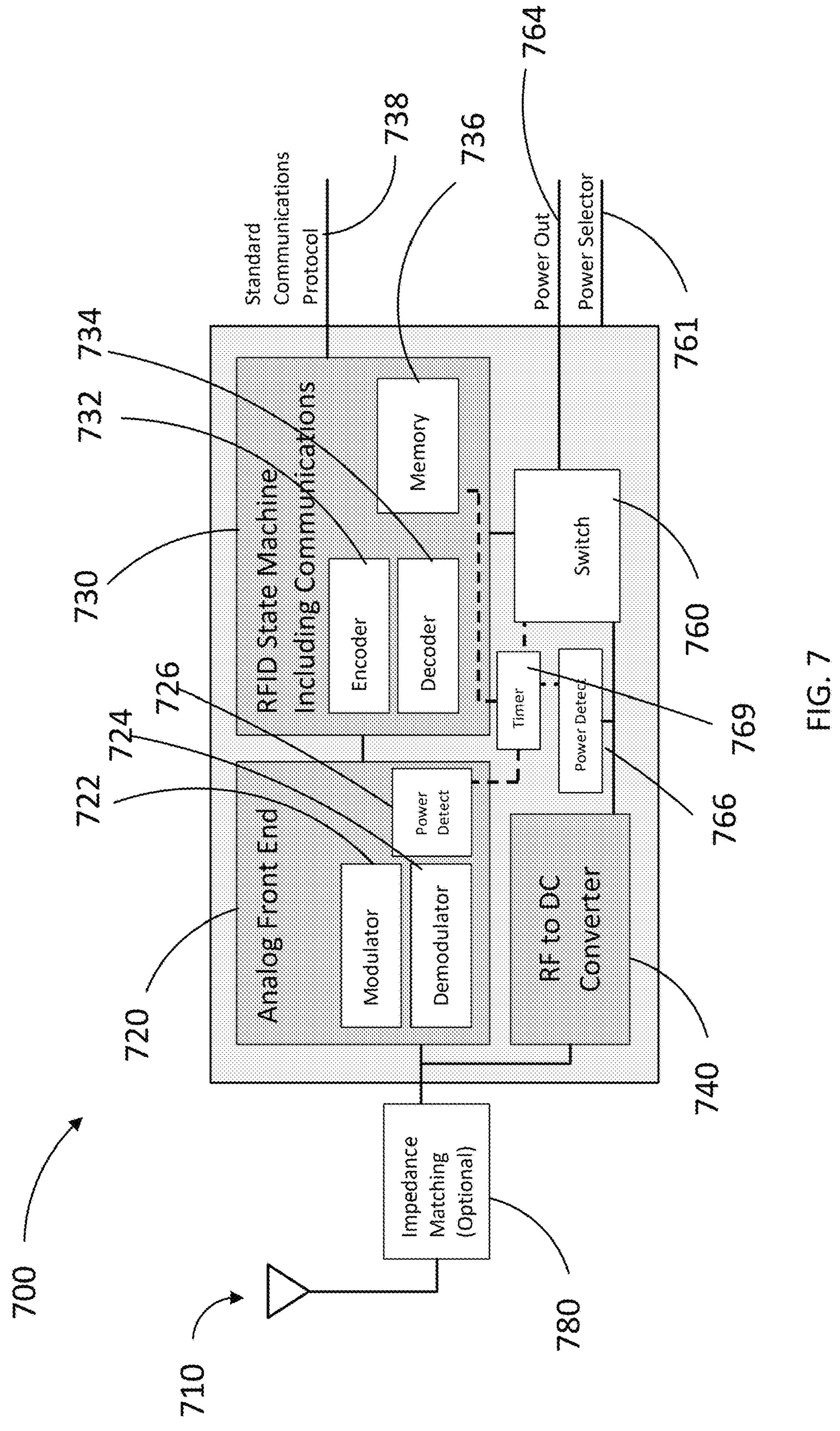
FIG. 7 is a schematic illustration of an RFID ASIC system, according to an embodiment.

In some embodiments, the DC power supplied by the RF-to-DC converter can be split based on time using one or more internal or external timers that operate independently of user control or device input parameters. For example, FIG. 7 is a schematic illustration of an RFID ASIC system 700 including an antenna 710, analog circuitry 720 (also referred to as an analog front end), an RFID state machine 730, and an RF-to-DC converter 740. The antenna 710, analog circuitry 720, the RFID state machine 730, and/or the RF-to-DC converter 740 can be the same or similar in structure and/or function to any similarly named components described herein, such as the antenna 210, the analog circuitry 220, the RFID state machine 230, and the RF-to-DC converter 240, respectively. For example, the analog circuitry 720 includes a modulator 722 and a demodulator 724 and is operatively coupled to the antenna 710 and the RFID state machine 730, which includes an encoder 732, a decoder 734, and a memory 736. As shown, the system 700 can optionally include an impedance matching network 780 disposed between the antenna 710 and the analog circuitry 720 and/or the RF-to-DC converter 740. The system 700 also includes a standard communications protocol interface 738 operably coupled to the RFID state machine 730, a switch 760, and a power out pin 764 coupled to the switch 760. The switch 760 can be the same or similar in structure and/or function to any of the switches described herein, such as the switch 660. Additionally, similarly as described above with respect to the system 500, the system 700 can include a power detector 766 and/or a power detector 726 configured to measure power levels within the system 700 and the switch 760 can transition between providing power to the RFID state machine 730 or the power out pin 764 based in part on the power measurements (e.g., in combination with transitioning based on time).

The system 700 includes a timer 769. The timer 769 can be, for example, a fixed internal timer. The switch 760 can alternate directing power received from the RF-to-DC converter 740 to the RFID state machine 730 or the power out pin 764 upon expiration of the timer 769. The power split can be equal or unequal with respect to time durations during which the power is provided to the RFID state machine 730 or the power out pin 764. In some implementations, the period of the timer 769 will be associated with one full cycle of delivery of power to the RFID state machine 730 and delivery of power to the power out pin 764. The duty cycle of the timer 769 can determine the time durations within which power is directed to each of the RFID state machine 730 or the power out pin 764. Alternatively, the system 700 can include two distinct timers 769. The timer period and/or duty cycle can be set during design and/or manufacture of the timer(s) 769.

In some implementations, instead of the system 700 including a fixed timer controlling operation of the switch 760, the timer period and duty cycle can be varied by the user. These parameters can be read out by user memory and used to program the timer 769. The parameters can be changed in the memory 736 by an RFID interrogator or the onboard communications protocol interface 738. In some embodiments, the duty cycle and/or period can also be set using external analog pins (e.g., a power selector 761) with the analog voltage corresponding to unique timer parameters. The period and duty cycle can be read at power up, at expiration of a second timer, or both to check if the period or duty cycle have been changed. The analog voltage can be monitored using the power detector 726 and/or the power detector 766 similarly as described above with respect to the system 500.

Additionally, the timer period and duty cycle can be changed dynamically based on input parameters, such as the available RF input power and available DC output power. The available power can be measured the same as for the above power split method, through a comparator, supervisor, or current sense amplifier for the DC output or through a level detector or RF-to-DC converter at the RF input. The timer period and duty cycle can be adjusted accordingly.

Figure 8:
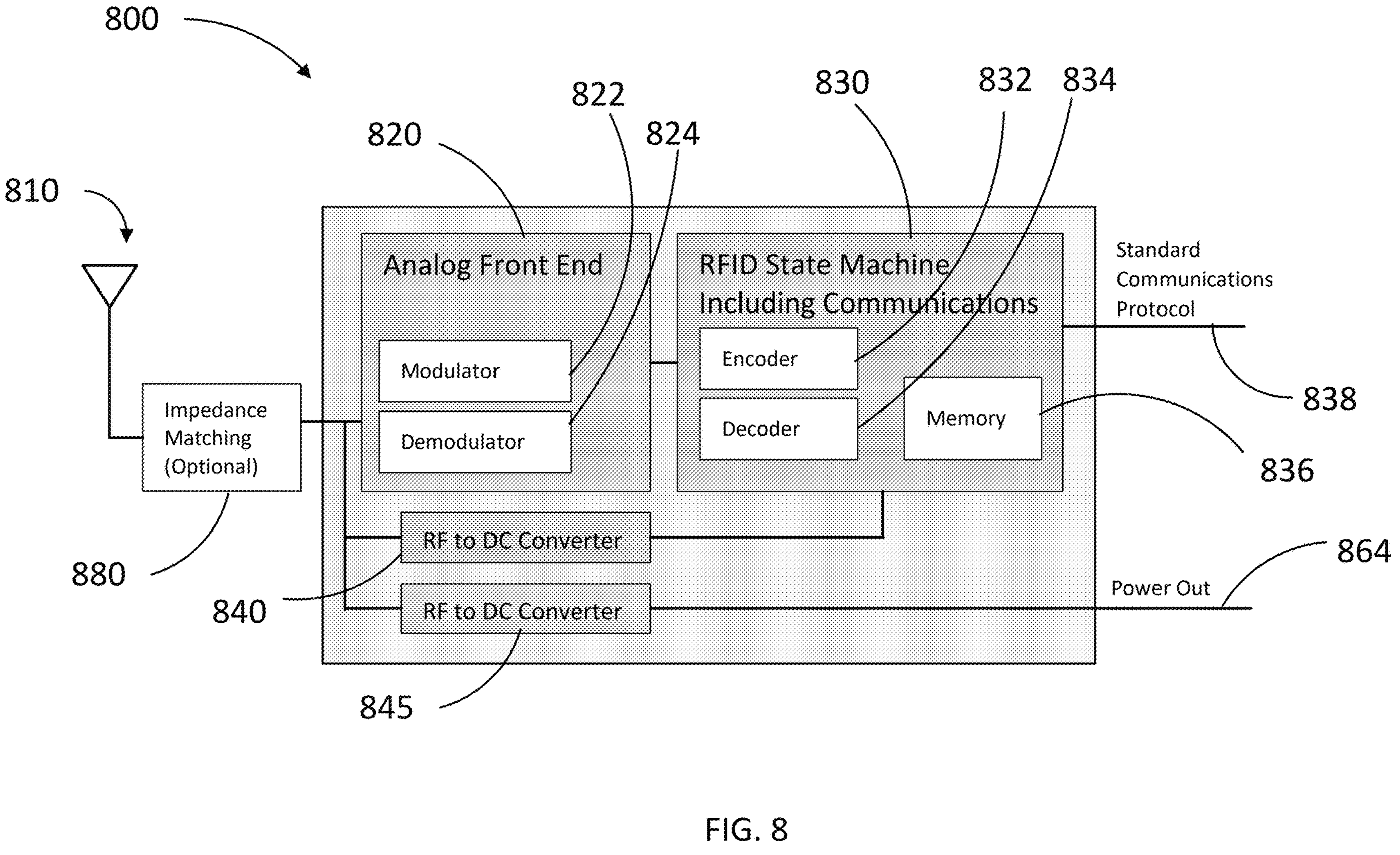
FIG. 8 is a schematic illustration of an RFID ASIC system, according to an embodiment.

In some embodiments, the input RF signal can be split instead of the DC output of an RF-to-DC converter. For example, FIG. 8 is a schematic illustration of an RFID ASIC system 800 having a first RF-to-DC converter 840 (also referred to as a first harvester) and a separate second RF-to-DC converter 845 (also referred to as a second harvester) coupled to the same input RF source (i.e., an antenna 810) and configured to split received RF signal and convert the RF signal to DC power. The first RF-to-DC converter 840 can have an impedance and the second RF-to-DC converter 845 can have an impedance that can be the same or different from the impedance of the first RF-to-DC converter 840. The system 800 includes the antenna 810, analog circuitry 820 (also referred to as an analog front end), an RFID state machine 830, the first RF-to-DC converter 840, and the second RF-to-DC converter 845. The antenna 810, analog circuitry 820, the RFID state machine 830, and/or the RF-to-DC converters 840 and 845 can be the same or similar in structure and/or function to any similarly named components described herein, such as the antenna 210, the analog circuitry 220, the RFID state machine 230, and the RF-to-DC converter 240, respectively. For example, the analog circuitry 820 includes a modulator 822 and a demodulator 824 and is operatively coupled to the antenna 810 and the RFID state machine 830, which includes an encoder 832, a decoder 834, and a memory 836. The system 800 also includes a standard communications protocol interface 838 operably coupled to the RFID state machine 830 and a power out pin 864. The first RF-to-DC converter 840 is coupled to the RFID state machine 830, and the second RF-to-DC converter 845 is coupled to the power out pin 864.

As shown in FIG. 8, an RF signal received via the antenna 810 can be split between the RFID state machine 830 and the power out pin 864 using the first RF-to-DC converter 840 and the second RF-to-DC converter 845. The first RF-to-DC converter 840 and the second RF-to-DC converter 845 can be disposed in parallel and operably coupled to the antenna 810 such that each of the first RF-to-DC converter 840 and the second RF-to-DC converter 845 can receive a portion of the RF signal received by the antenna 810 from the antenna 810.

In some embodiments, a power splitter or divider (not shown in FIG. 8) can be included between the analog front end 820 and the input to each of the first RF-to-DC converter 840 and the second RF-to-DC converter 845. The power of the RF signal split between the first RF-to-DC converter 840 and the second RF-to-DC converter 845 can be equal or unequal. In some implementations, the system 800 includes an RF power splitter including passive components such as one or more capacitors, inductors, and/or resistors. In some implementations, the system 800 includes an RF power switch that includes one or more timers and/or RF switches.

In some implementations, the system 800 includes one or more known RF power splitting architectures, such as a Wilkinson power divider.

Thus, in some implementations, an RF signal received via the antenna 810 can be split such that a first portion of the RF signal is received by the first RF-to-DC converter 840 and a second portion of the RF signal is received by the second RF-to-DC converter 845. The first RF-to-DC converter 840 can convert the first portion of the RF signal into a first portion of DC power and can provide the first portion of DC power to the RFID state machine 830. The second RF-to-DC converter 845 can convert the second portion of the RF signal into a second portion of DC power and can provide the second portion of DC power to the power out pin 864. The first portion of the RF signal can be at a first frequency or a first frequency range, and the second portion of the RF signal can be at a second frequency or a second frequency range. The second frequency and the second frequency range can be different than the first frequency and the first frequency range, respectively.

In some embodiments, the first RF-to-DC converter 840 and the second RF-to-DC converter 845 can have the same or different numbers of stages. In some embodiments, the first RF-to-DC converter 840 and the second RF-to-DC converter 845 can be of the same or different architecture, allowing power to be split equally or unequally and allowing the power out pin 864 and the RFID state machine 830 to have different output voltages.

Figure 9:
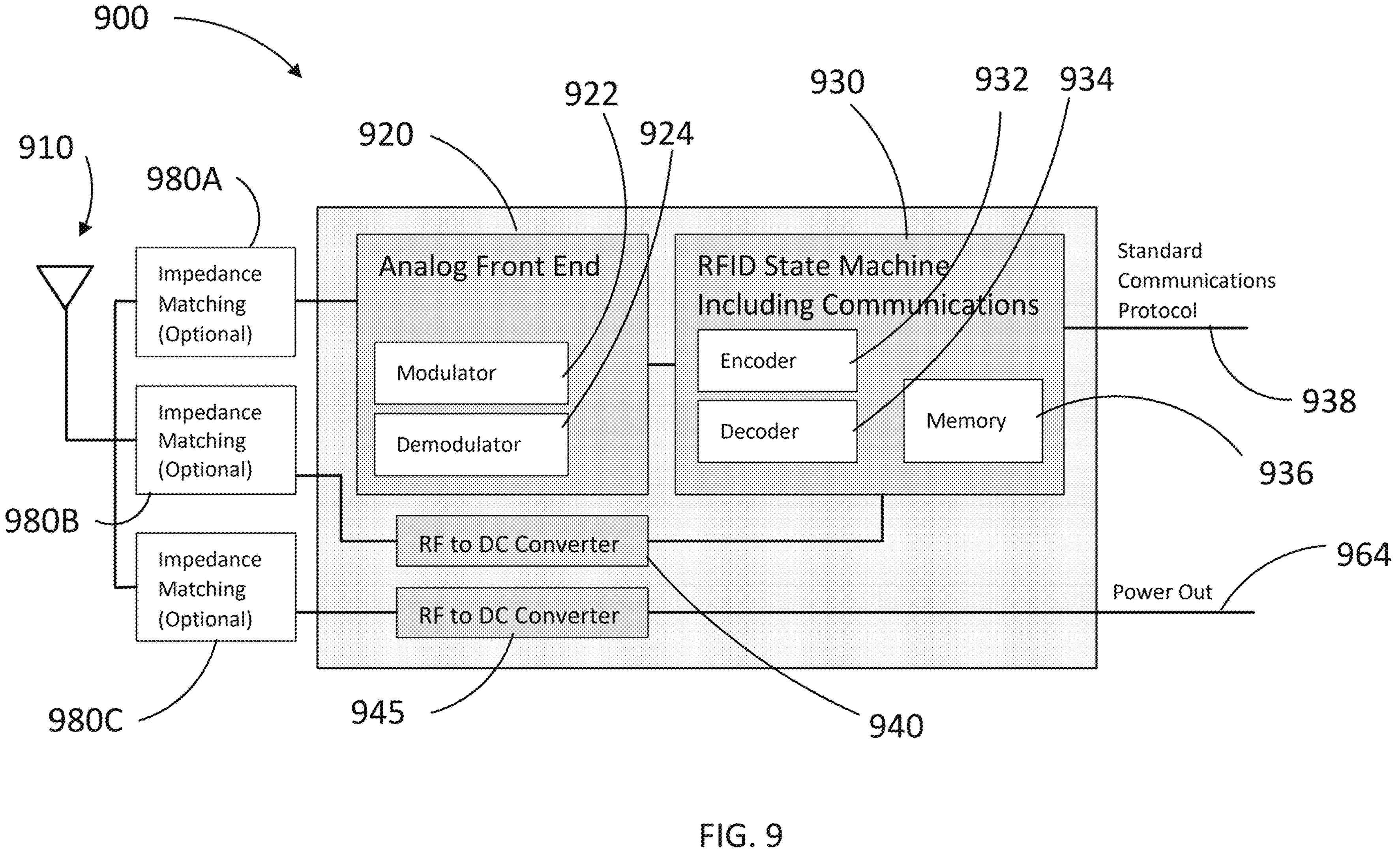
FIG. 9 is a schematic illustration of a variation of the RFID ASIC system shown in FIG. 8, according to an embodiment.

As shown in FIG. 8, in some embodiments, the analog front end 820, the first RF-to-DC converter 840, and the second RF-to-DC converter 845 can share the same external impedance matching network 880, which can optionally be included in the system 800 between the antenna 810 and the analog circuitry 820, the first RF-to-DC converter 840, and the second RF-to-DC converter 845. In some embodiments, as shown in FIG. 9, which is a variation of the system 800 shown in FIG. 8, rather than sharing the same external impedance matching network, each of the analog front end 920 (which includes modulator 922 and demodulator 924), the first RF-to-DC converter 940, and the second RF-to-DC converter 945 (which is coupled to power out pin 964) of system 900 can include or be coupled to a respective impedance matching network. For example, as shown in FIG. 9, the analog front end 920 can be coupled to the antenna 910 via the impedance matching network 980A, the first RF-to-DC converter 940 can be coupled to the antenna 910 via the impedance matching network 980B, and the second RF-to-DC converter 945 can be coupled to the antenna 910 via the impedance matching network 980C. The analog front end 920 is coupled to RFID state machine 930 (which includes encoder 932, decoder 934 and memory 936), which is in turn coupled to a standard communications protocol interface 938.

In some implementations, one or more of the analog front end 820 (or 920), the first RF-to-DC converter 840 (or 940), and the second RF-to-DC converter 845 (or 945) can share the same tuning network (e.g., an external tuning network) (not shown in FIGS. 8 and 9). In some implementations, the external tuning network can also be used for passive voltage amplification, increasing the sensitivity of the first RF-to-DC converter 840 (or 940) and the second RF-to-DC converter 845 (or 945). This allows for differing sensitivities and efficiencies of the first RF-to-DC converter 840 (or 940) and the second RF-to-DC converter 845 (or 945), allowing more control of the separate paths.

Figure 10:
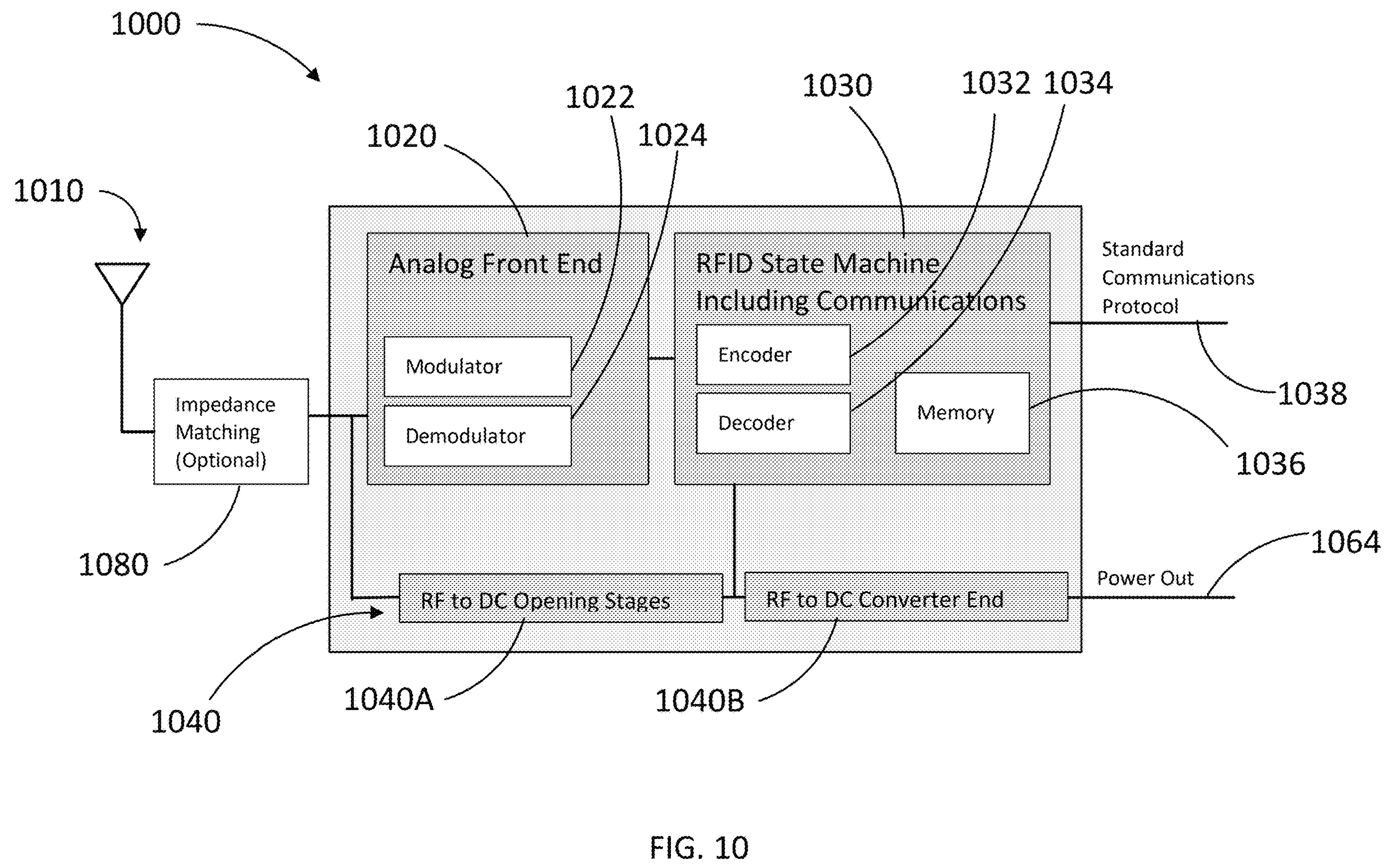
FIG. 10 is a schematic illustration of an RFID ASIC system, according to an embodiment.

In some embodiments, an RF-to-DC converter having multiple stages can be used to split power of an RF signal, with the output of different stages being available to different components of the system. For example, FIG. 10 is a schematic illustration of an RFID ASIC system 1000 having an RF-to-DC converter 1040 including at least one opening stage 1040A and at least one end stage 1040B. The system 1000 includes an antenna 1010, analog circuitry 1020 (also referred to as an analog front end), an RFID state machine 1030, and the RF-to-DC converter 1040. The antenna 1010, analog circuitry 1020, the RFID state machine 1030, and/or the RF-to-DC converter 1040 can be the same or similar in structure and/or function to any similarly named components described herein, such as the antenna 210, the analog circuitry 220, the RFID state machine 230, and the RF-to-DC converter 240, respectively. For example, the analog circuitry 1020 includes a modulator 1022 and a demodulator 1024 and is operatively coupled to the antenna 1010 and the RFID state machine 1030, which includes an encoder 1032, a decoder 1034, and a memory 1036. The system 1000 also includes a standard communications protocol interface 1038 (e.g., operably coupled to the RFID state machine 1030) and a power out pin 1064.

The at least one opening stage 1040A of the RF-to-DC converter 1040 includes an output coupled to the RFID state machine 1030 and the at least one end stage 1040B includes an output coupled to the power out pin 1064. The RF-to-DC converter 1040 with multiple stages can receive power of an RF signal from the antenna 1010 and provide a first portion of the power to the RFID state machine 1030 and a second portion of the power to the power out pin 1064. Since the RFID state machine 1030 and the power out pin 1064 can tap into the RF-to-DC converter 1040 at the output of different stages, the RFID state machine 1030 and the power out pin 1064 can receive differing DC output voltages, which allows for differing sensitivities between the RFID state machine 1030 and the power out pin 1064. Thus, the system 1000 uses only one RF-to-DC converter 1040 and does not require a separate RF power splitter or divider to split the power of the RF signal received by the antenna 1010 and converted to DC power by the RF-to-DC converter 1040 between the RFID state machine 1030 and the power out pin 1064.

In some instances and/or embodiments, the energy of an RF signal received via the antenna of an RFID ASIC system (e.g., any of the RFID ASIC systems disclosed herein) can be insufficient for the RFID state machine to be operatively powered directly and continuously based on only the received energy of the RF signal (e.g., to complete an RFID communication operation). Thus, in some embodiments, the DC power produced by an RF-to-DC converter of the system based on the portion of the RF signal received by the RF-to-DC converter can be stored in an energy storage device of the system. Upon an amount of stored power in the energy storage device being at or above a threshold energy storage level (e.g., being an amount sufficient to fully power RFID communications of the RFID state machine), the energy storage device can provide the stored power to power the RFID state machine to complete a communication operation. Thus, in some embodiments, an RFID interrogator can communicate with the RFID ASIC system while the RFID state machine is operating based on the power stored in the energy storage device until the stored power has run out, at which point the process can repeat (e.g., the RF-to-DC converter can supply power to the energy storage device based on an RF signal or portion thereof received by the RF-to-DC converter via the antenna until the amount of stored power in the energy storage device reaches the threshold energy storage level again). In such an embodiment, the communications from the RFID ASIC system to the RFID interrogator may be intermittent, but the sensitivity of the RFID ASIC system can be greatly improved, allowing for more reliable reads in RF harsh environments and/or a greater read distance from the RFID interrogator to the RFID ASIC system.

Figure 11:
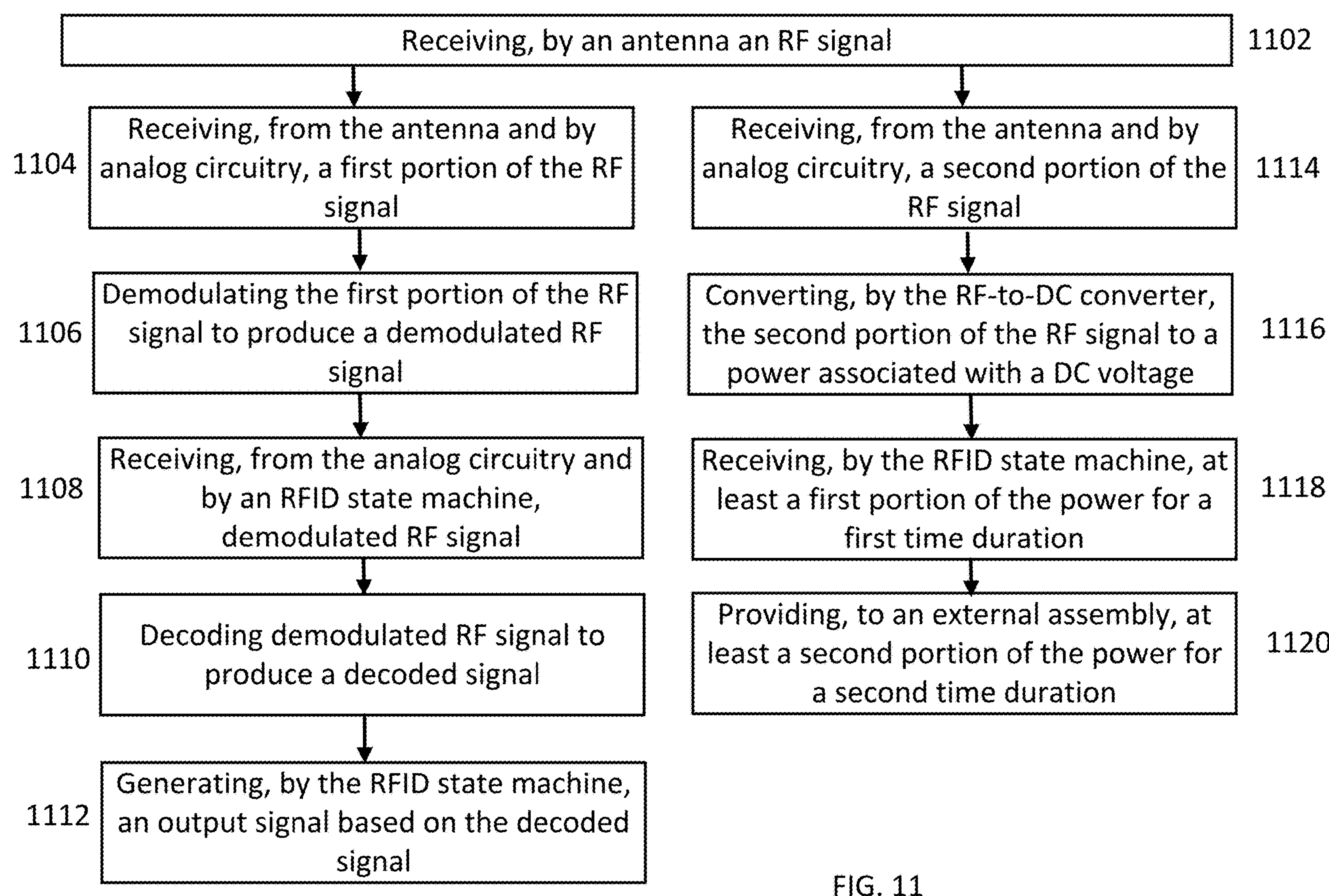
FIG. 11 is a schematic illustration of a method, according to an embodiment.

In some embodiments, a system, such as any of the systems disclosed herein, can be used to perform a method 1100. Additionally, the method 1100 can include any steps for performing any of the functions of any of the systems described herein. The method can be, for example, a method for arbitrating power of a received RF signal between a system (e.g., an RFID ASIC tag) and an external assembly couplable to the system. For example, FIG. 11 is a schematic illustration of the method 1100. The method 1100 includes, at 1102, receiving, by an antenna, an RF signal. At 1104, a first portion of the RF signal is received from the antenna by analog circuitry. At 1106, the first portion of the RF signal is demodulated to produce a demodulated RF signal. At 1108, the demodulated RF signal is received from the analog circuitry by an RFID state machine. At 1110, the demodulated RF signal is decoded to produce a decoded signal. At 1112, the RFID state machine can generate an output signal based on the decoded signal.

At 1114, an RF-to-DC converter can receive a second portion of the RF signal from the antenna. At 1116, the second portion of the RF signal can be converted by the RF-to-DC converter to a power associated with a direct current voltage. At 1118, at least a first portion of the power can be received by the RFID state machine for a first duration of time. At 1120, at least a second portion of the power can be provided to an external assembly for a second duration of time. In some embodiments, one of more of steps 1104 to 1112 can be performed by a system performing the method 1100 based on the at least a first portion of the power received by the RFID state machine in step 1118 (e.g., such that the demodulating, decoding, and/or generating is performed using operating power provided by the RF-to-DC converter and received by the RFID state machine).

In some embodiments, the first duration of time and the second duration of time can overlap such that a first portion of the power is received by the RFID state machine and a second portion of the power is provided to the external assembly concurrently. For example, the method can optionally include receiving the power, from the RF-to-DC converter, by a splitter, splitting the power into a first portion and a second portion, providing, by the splitter, the first portion of the power to the RFID state machine, and providing, by the splitter, the second portion of the power to the external assembly (e.g., via a power out pin operably coupled to the splitter and couplable to the external assembly). The splitter can be the same in structure and/or function as any of the splitters described herein.

In some embodiments, the first duration of time and the second duration of time can be non-overlapping such that the power is received by the RFID state machine from the RF-to-DC converter and power is not provided to the external assembly from the RF-to-DC converter during the first duration of time and such that the power is not received by the RFID state machine from the RF-to-DC converter and the power is provided to the external assembly from the RF-to-DC converter during the second duration of time. For example, the method can optionally include receiving the power, from the RF-to-DC converter, by a switch, providing the power to the RFID state machine by the switch for the first duration of time, and, after transitioning the switch from a first configuration to a second configuration, providing the power to the external assembly by the switch for the second duration of time (e.g., via a power out pin operably coupled to the splitter and couplable to the external assembly). The switch can be the same in structure and/or function as any of the switches described herein.

In some embodiments, the RF-to-DC converter described, for example, with respect to steps 1014 and 1016 can be a first RF-to-DC converter and the method 1000 can optionally include receiving, from the antenna and by a second RF-to-DC converter, a third portion of the RF signal. The second RF-to-DC converter can convert the third portion of the RF signal to a second power associated with a direct current voltage. The second portion of the RF signal can be at a first frequency or a first frequency range, and the third portion of the RF signal can be at a second frequency or a second frequency range. The second frequency and the second frequency range can be different than the first frequency and the first frequency range, respectively. The first RF-to-DC converter can have an impedance and the second RF-to-DC converter can have an impedance that can be the same or different from the impedance of the first RF-to-DC converter. The RFID state machine can receive a first power from the first RF-to-DC converter and the second power can be provided from the second RF-to-DC converter to the external assembly (e.g., concurrently to the RFID state machine receiving the first power or during a second, non-overlapping period of time as the RFID state machine receives the first power).

In some embodiments, the RF-to-DC converter described, for example, with respect to steps 1014 and 1016 can be a multi-stage converter and the method 1000 can optionally include converting, by a first stage of the RF-to-DC converter, a first portion of the second portion of the RF signal to produce a first power (also referred to as a first portion of a power produced by the RF-to-DC converter) to be received by the RFID state machine from an output of the first stage. The method 1000 can optionally also include converting, by a second stage of the RF-to-DC converter, a second portion of the second portion of the RF signal to produce a second power (also referred to as a second portion of a power produced by the RF-to-DC converter) to be provided to the external assembly (e.g., concurrently to the RFID state machine receiving the first power or during a second, non-overlapping period of time as the RFID state machine receives the first power).

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the systems (or any of its components) described herein can include a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to:

magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Although various embodiments have been described as having particular features and/or combinations of components, other embodiments are possible having a combination of any features and/or components from any of the embodiments where appropriate.

The invention claimed is:

1. A system, comprising:

an antenna;

analog circuitry operatively coupled to the antenna and configured to demodulate a first portion of a radio frequency (RF) signal received via the antenna to produce a demodulated RF signal;

a radio-frequency identification (RFID) state machine operatively coupled to the analog circuitry, the RFID state machine configured to receive the demodulated RF signal from the analog circuitry, to decode the demodulated RF signal to produce a decoded signal, and to generate an output signal based on the decoded signal;

a radio-frequency-to-direct current (RF-to-DC) converter operatively coupled to the antenna, the RF-to-DC converter configured to receive a second portion of the RF signal from the antenna and to convert the second portion of the RF signal to a power associated with a direct current (DC) voltage; and one of a splitter or a switch operatively coupled to the RF-to-DC converter and the RFID state machine and configured to be coupled to an external assembly, the one of the splitter or the switch configured to receive the power from the RF-to-DC converter and to provide the power to at least one of the RFID state machine or the external assembly, the RFID state machine and the external assembly each configured to operate based on the power.

2. The system of claim 1, wherein the one of the splitter or the switch is configured to provide a first portion of the power to the RFID state machine and a second portion of the power to the external assembly.

3. The system of claim 1, wherein the one of the splitter or the switch includes a splitter, the splitter configured to provide a first portion of the power to the RFID state machine and a second portion of the power to the external assembly simultaneously.

4. The system of claim 1, wherein the one of the splitter or the switch includes a splitter that has a switching device.

5. The system of claim 2, further comprising a timer coupled to the one of the splitter or the switch and configured to send a timer signal to the one of the splitter or the switch such that the one of the splitter or the switch controls a ratio of the first portion of the power relative to the second portion of the power based on the timer signal.

6. The system of claim 1, further comprising an impedance matching network operatively coupled to the antenna, analog circuitry, and the RF-to-DC converter, the impedance matching network configured to receive the RF signal from the antenna, the impedance matching network configured to send the RF signal to the analog circuitry and RF-to-DC converter.

7. The system of claim 2, further comprising:

a memory operatively coupled to the one of the splitter or the switch, the one of the splitter or the switch configured to provide the first portion of the power and the second portion of the power based on a ratio that is based on a user setting stored in the memory.

8. The system of claim 2, wherein the one of the splitter or the switch is configured to provide the first portion of the power and the second portion of the power based on a position of an external analog pin operatively coupled to the one of the splitter or the switch.

9. The system of claim 2, wherein the one of the splitter or the switch is configured to provide the first portion of the power and the second portion of the power based on one or more characteristics of the power from the RF-to-DC converter.

10. The system of claim 2, wherein the one of the splitter or the switch is configured to provide the first portion of the power and the second portion of the power based on input parameters of the antenna, the analog circuitry, the RFID state machine, the RF-to-DC converter and the one of the splitter or the switch, collectively.

11. The system of claim 2, wherein a magnitude of the first portion of the power is sufficient for the RFID state machine to provide the output signal, and a magnitude of the second portion of the power includes a remainder of the power not included in the first portion of the power.

12. The system of claim 1, wherein the RF-to-DC converter is constructed using a complementary metal-oxide semiconductor (CMOS) process.

13. The system of claim 1, wherein the RF-to-DC converter includes the analog circuitry and is configured to perform the demodulation.

14. A system, comprising:

an antenna;

analog circuitry operatively coupled to the antenna and configured to demodulate a portion of an radio frequency (RF) signal received via the antenna to produce a demodulated RF signal;

a radio-frequency identification (RFID) state machine operatively coupled to the analog circuitry, the RFID state machine configured to receive the demodulated RF signal from the analog circuitry, to decode the demodulated RF signal to produce a decoded signal, and to generate an output signal based on the decoded signal;

an impedance matching network operatively coupled to the antenna;

a first radio-frequency-to-direct current (RF-to-DC) converter operatively coupled to the impedance matching network, the first RF-to-DC converter configured to receive a second portion of the RF signal received via the antenna via the impedance matching network and to convert the second portion of the RF signal to a first power associated with a first direct current (DC) voltage, the first RF-to-DC converter configured to provide the first power to the RFID state machine; and a second RF-to-DC converter operatively coupled in parallel to the first RF-to-DC converter and operatively coupled to the impedance matching network, the second RF-to-DC converter configured to receive a third portion of the RF signal received via the antenna via the impedance matching network and to convert the third portion of the RF signal to a second power associated with a second DC voltage, the second RF-to-DC converter configured to provide the second power to an external assembly.

15. The system of claim 14, wherein:

the first portion of the RF signal is associated with a first frequency range, the second portion of the RF signal is associated with second frequency range, and the third portion of the RF signal is associated with a third frequency range.

16. The system of claim 14, wherein:

the first RF-to-DC converter is configured to have a substantially optimized performance, and the second RF-to-DC converter is configured to have a substantially optimized performance.

17. The system of claim 14, wherein the first RF-to-DC converter includes the analog circuitry and is configured to perform the demodulation.

18. A system, comprising:

an antenna;

analog circuitry operatively coupled to the antenna and configured to demodulate a first portion of a radio frequency (RF) signal received via the antenna to produce a demodulated RF signal;

a radio-frequency identification (RFID) state machine operatively coupled to the analog circuitry, the RFID state machine configured to receive the demodulated RF signal from the analog circuitry, to decode the demodulated RF signal to produce a decoded signal, and to generate an output signal based on the decoded signal; and a radio-frequency-to-direct current (RF-to-DC) converter operatively coupled to the antenna, the RF-to-DC converter configured to receive a second portion of the RF signal from the antenna, the RF-to-DC converter including a first stage configured to convert a first portion of the second portion of the RF signal to a first power associated with a first direct current (DC) voltage, the RF-to-DC converter configured to provide the first power to the RFID state machine, the RF-to-DC converter including a second stage configured to convert a second portion of the second portion of the RF signal to a second power associated with a second DC voltage, the RF-to-DC converter configured to provide the second power to an external assembly.

19. The system of claim 18, wherein the first DC voltage and the second DC voltage are unequal in magnitude.

20. The system of claim 18, wherein the first stage of the RF-to-DC converter includes the analog circuitry and is configured to perform the demodulation.

* * * * *